US008166281B2

(12) United States Patent
Gschwind et al.

(10) Patent No.: US 8,166,281 B2
(45) Date of Patent: *Apr. 24, 2012

(54) IMPLEMENTING INSTRUCTION SET ARCHITECTURES WITH NON-CONTIGUOUS REGISTER FILE SPECIFIERS

(75) Inventors: Michael Karl Gschwind, Chappaqua, NY (US); Robert Kevin Montoye, New York, NY (US); Brett Olsson, Cary, NC (US); John-David Wellman, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/534,968

(22) Filed: Aug. 4, 2009

(65) Prior Publication Data

US 2009/0300331 A1    Dec. 3, 2009

Related U.S. Application Data

(60) Division of application No. 12/062,131, filed on Apr. 3, 2008, now Pat. No. 7,793,081, which is a continuation of application No. 11/446,020, filed on Jun. 2, 2006, now Pat. No. 7,421,566.

(60) Provisional application No. 60/707,573, filed on Aug. 12, 2005.

(51) Int. Cl.
*G06F 9/30* (2006.01)
(52) U.S. Cl. ........................................ 712/216; 712/208
(58) Field of Classification Search .......... 712/216–219, 712/208–210
See application file for complete search history.

(56) References Cited

U.S. PATENT DOCUMENTS

| 4,829,424 | A | * | 5/1989 | Lee ........................................ 1/1 |
| 5,386,563 | A | | 1/1995 | Thomas |
| 5,737,625 | A | | 4/1998 | Jaggar |
| 5,768,574 | A | | 6/1998 | Dutton et al. |
| 5,822,778 | A | | 10/1998 | Dutton et al. |
| 5,838,984 | A | | 11/1998 | Nguyen et al. |
| 5,903,919 | A | * | 5/1999 | Myers .......................... 711/220 |
| 5,926,646 | A | | 7/1999 | Pickett et al. |
| 6,014,739 | A | * | 1/2000 | Christie ........................ 712/228 |
| 6,128,710 | A | * | 10/2000 | Greenspan et al. ........... 711/152 |

(Continued)

OTHER PUBLICATIONS

M. Moudgill, K. Pingali, S. Vassilidis In "Register Renaming and Dynamic Speculation: An Alternative Approach," In Proceedings of the 26th Annual International Symposium on Microarchitecture, pp. 202-213, Dec. 1993.

Moreno et al., In "An Innovative low-power high-performance programmable signal processor for digital communications", IBM Journal of Research and Development, vol. 47, No. 2/3, 2003, pp. 299-326.

R. H. Dennard et al., in "Design of Ion-Implanted MOSFETs with Very Small Physical Dimensions," IEEE Journal of Solid-Siate Circuits, SC-9, pp. 256-268, 1974.

*Primary Examiner* — Idriss N Alrobaye
(74) *Attorney, Agent, or Firm* — Tutunjian & Bitetto, P.C.; Vazken A. Alexanian

(57) ABSTRACT

There are provided methods and computer program products for implementing instruction set architectures with non-contiguous register file specifiers. A method for processing instruction code includes processing a fixed-width instruction of a fixed-width instruction set using a non-contiguous register specifier of a non-contiguous register specification. The fixed-width instruction includes the non-contiguous register specifier.

16 Claims, 16 Drawing Sheets

U.S. PATENT DOCUMENTS

| | | |
|---|---|---|
| 6,154,832 A | 11/2000 | Maupin |
| 6,157,996 A | 12/2000 | Christie et al. |
| 6,839,828 B2 | 1/2005 | Gschwind et al. |
| 7,434,032 B1 * | 10/2008 | Coon et al. ............ 712/217 |
| 2001/0042192 A1 * | 11/2001 | Le et al. ............ 712/215 |
| 2002/0116602 A1 * | 8/2002 | Kissell et al. ............ 712/223 |
| 2003/0037085 A1 * | 2/2003 | Sandbote ............ 708/490 |
| 2004/0030863 A1 * | 2/2004 | Paver et al. ............ 712/34 |
| 2005/0055535 A1 * | 3/2005 | Moyer et al. ............ 712/4 |
| 2005/0114629 A1 | 5/2005 | Altman et al. |
| 2005/0160097 A1 | 7/2005 | Gschwind et al. |
| 2006/0020772 A1 * | 1/2006 | Hussain ............ 712/210 |

* cited by examiner

FIG. 1A

| | OPCD | VS | RA | RB | XO | VSX | XO |
|---|---|---|---|---|---|---|---|
| 102 → | | | | | | | |
| 104 → | OPCD | VT | RA | RB | XO | VTX | XO |

| | OPCD | VT | VA | VB | AX | XO | VC | AX | XO | VTX | VBX |
|---|---|---|---|---|---|---|---|---|---|---|---|
| 122 → | | | | | | | | | | | |
| 124 → | OPCD | VT | VA | VB | AX | SHB | | AX | XO | VTX | VBX |

| | OPCD | VT | VA | VB | AX | XO | AX | XO | VTX | VBX |
|---|---|---|---|---|---|---|---|---|---|---|
| 141 → | OPCD | VT | VA | VB | AX | XO | AX | XO | VTX | VBX |
| 142 → | OPCD | VT | VA | VC | AX | XO | AX | XO | VTX | VCX |
| 143 → | OPCD | VT | / / / / | VB | XO | | | | VTX | VBX |
| 144 → | OPCD | VT | / / / / / / / / / | | XO | | | | VTX | XO |
| 145 → | OPCD | VT | SIM | / / / / | XO | | | | VTX | // |
| 146 → | OPCD | VT | UIM | VB | XO | | | | VTX | VBX |
| 147 → | OPCD | VT | // UIM | VB | XO | | | | VTX | VBX |
| 148 → | OPCD | VT | /// UIM | VB | XO | | | | VTX | VBX |
| 149 → | OPCD | VT | / WMASK | VB | XO | SHW | XO | | VTX | VBX |
| 150 → | OPCD | VT | DT MS | VB | XO | SHW | XO | | VTX | VBX |
| 151 → | OPCD | VT | DT // | VB | XO | | | | VTX | VBX |
| 152 → | OPCD | VT | UIM | VB | XO | UIX | XO | | VTX | VBX |

| OPCD | VS | RA | RB | XO | / / | S | XO |
|---|---|---|---|---|---|---|---|
| OPCD | VT | RA | RB | XO | / / | T | XO |
| 0 | 6 | 11 | 16 | 21 | | 28 | 30 31 |

| OPCD | VT | VA | VB | VC | XO | A | B | T | C |
|---|---|---|---|---|---|---|---|---|---|
| OPCD | VT | VA | VB | XO | SHB | XO | A | B | T | XO |
| 0 | 6 | 11 | 16 | 21 22 | | 26 | | 28 29 30 31 |

| OPCD | VT | VA | VB | XO | A | B | T | XO |
|---|---|---|---|---|---|---|---|---|
| OPCD | VT | / / / / / | VB | XO | / | B | T | XO |
| OPCD | VT | UIM | VB | XO | / | B | T | XO |
| OPCD | VT | / UIM | VB | XO | / | B | T | XO |
| OPCD | VT | / / UIM | VB | XO | / | B | T | XO |
| OPCD | VT | / / / UIM | VB | XO | / | B | T | XO |
| OPCD | VT | SIM | | XO | / / | T | XO |
| OPCD | VT | / / / / / | VB | XO | / | B | T | XO |
| 0 | 6 | 11 | 16 | 21 | | 28 29 30 31 |

| OPCD | VT | VA | VB | Rc | XO | A | B | T | XO |
|---|---|---|---|---|---|---|---|---|---|
| 0 | 6 | 11 | 16 | 21 22 | | 28 29 30 31 |

260

| | | | | | | | |
|---|---|---|---|---|---|---|---|
| OPCD | VT | VA | VB | BM | XO | TX | BX |
| 0 | 6 | 11 | 16 | 21 | 24 | 28 | 30 |

| Opcode | XO | Mnemonic |
|---|---|---|
| 4 | 0000 | evaddmi AX=00 |
| 4 | 0001 | vaddmi |
| 4 | 0010 | evaddmi AX=10 |
| 4 | 0011 | vaddcmi |
| 4 | 0100 | |
| 4 | 0101 | vsubmi |
| 4 | 0110 | evaddmi AX=10 |
| 4 | 0111 | evaddmi AX=11 |
| 4 | 1000 | evselami AX=00 |
| 4 | 1001 | vmulmi |
| 4 | 1010 | vnmulmi |
| 4 | 1011 | evselami AX=11 |
| 4 | 1100 | vselami |
| 4 | 1101 | evselami AX=01 |
| 4 | 1110 | evselami AX=10 |
| 4 | 1111 | vselbmi |

X-Form

1100

| OPCD | VT | RA | RB | XO | / |
|---|---|---|---|---|---|
| OPCD | VS | RA | RB | XO | / |

VA-Form

1130

| OPCD | VT | VA | VB | VC | XO |
|---|---|---|---|---|---|
| OPCD | VT | VA | VB | / SHB | XO |

VX-Form

1160

| OPCD | VT | VA | VB | XO |
|---|---|---|---|---|
| OPCD | VT | / / / / / | VB | XO |
| OPCD | VT | UIM | VB | XO |
| OPCD | VT | / UIM | VB | XO |
| OPCD | VT | // UIM | VB | XO |
| OPCD | VT | /// UIM | VB | XO |
| OPCD | VT | SIM | / / / / / | XO |
| OPCD | VT | / / / / / | VB | XO |

| OPC | RT | RS1 | RS2 | XOP |

0 | OPC | eRT | eRS1 | eRS2 | XOP |

FIG. 12B

IMPLEMENTING INSTRUCTION SET ARCHITECTURES WITH NON-CONTIGUOUS REGISTER FILE SPECIFIERS

CROSS-REFERENCE TO RELATED APPLICATIONS

This application is a divisional of U.S. Non-Provisional Application Ser. No. 12/062,131, filed on Apr. 3, 2008 now U.S. Pat. No. 7,793,081, which is a continuation of U.S. Non-Provisional application Ser. No. 11/446,020, filed on Jun. 2, 2006 now U.S. Pat. No. 7,421,566, which claims the benefit of U.S. Provisional Application Ser. No. 60/707,573, filed on Aug. 12, 2005, all of which are incorporated by reference herein in their entireties. Moreover, this application is related to U.S. Non-Provisional application Ser. No. 12/062,057 filed on Apr. 3, 2008, which is a continuation of U.S. Non-Provisional application Ser. No. 11/446,031, filed on Jun. 2, 2006, which claims the benefits of U.S. Provisional Ser. No. 60/707,572, filed on Aug. 12, 2005, all of which are incorporated by reference herein in their entireties.

BACKGROUND

1. Technical Field

The present invention generally relates to the processing of instructions in a microprocessor, and more particularly, to implementing an extended register set for one or more classes of instructions in a microprocessor.

2. Description of the Related Art

In modern microprocessors, increases in latencies have been an increasingly severe problem. These increases are occurring both for operations performed on the chip, and for memory access latencies. There are a number of reasons for this phenomenon.

One reason is the trend to achieve performance increases by using higher clock frequencies. This leads to deeper pipelining (i.e., the division of a basic operation into multiple stages) and, hence, a larger number of total stages, as an operation is divided into ever smaller units of work to achieve these high frequencies.

Yet another reason relates to the differences in chip and memory speeds. That is, while chip speeds have been increasing, memory speed has been increasing at a much smaller rate. Thus, in terms of processor cycles to access a memory location in memory, latency has increased significantly. The relatively faster increase in chip speed is due to both the above-mentioned deeper pipelining, and to CMOS scaling used as a technique to increase chip speeds, as disclosed by R. H. Dennard et al., in "Design of Ion-Implanted MOSFETs with Very Small Physical Dimensions," IEEE Journal of Solid-State Circuits, SC-9, pp. 256-68, 1974, which is incorporated by reference herein.

Moreover, another reason relates to differences in wire and logic speeds. That is, as CMOS scaling is applied ever more aggressively, wire speeds do not scale at the same rate as logic speeds, leading to a variety of latency increases, e.g., by increasing the time required to write back an operation's results.

In addition to aggressive technology scaling and deep pipelining, computer architects have also turned to the use of more aggressive parallel execution by means of superscalar instruction issue, whereby multiple operations can be initiated in a single cycle. Recent microprocessors such as the state-of-the art Power 5 or PowerPC 970 processor can dispatch 5 operations per cycle and initiate operations at the rate of 7 and 9 operations per cycle, respectively.

To continue improving the performance of microprocessors, two challenges are of significance: namely achieving high levels of parallelism and tolerating increasing latency (in terms of processor cycles) of memory. Both achieving higher parallelism and tolerating longer latency require that programs are compiled so as to simultaneously use more independent strands of computation. This, in turn, requires a large number of registers to be available to support the multiple independent strands of computation by storing all of their intermediate results.

A result of the ability to execute more instructions in pipelines with increasing latency, and to initiate execution in multiple pipelines, requires ever-larger amounts of data to be maintained by a processor, to serve as inputs or to be received as results of operations. To accomplish this, architects and programmers have two options: retrieve and store data in a memory hierarchy; or in on-chip register file storage.

Of these choices, register file storage offers multiple advantages, such as higher bandwidth and shorter latency, as well as lower energy dissipated per access. However, the number of registers specified in architectures has not increased since the introduction of RISC computing (when the size of register files was increased from a customary 8 or 16 registers to 32 registers) until recently. Thus, as the demands for faster register storage to buffer input operands and operation results from an increasing number of instructions simultaneously being executed is growing, the number of architected registers has stayed constant, while the performance of memory hierarchies has de facto decreased in terms of processor cycles to provide data to the processor core.

To show how the effectiveness of register files has diminished, in light of changes to processor architecture that have occurred in response to technology shifts, consider the following simple ratios. About 15 years ago (circa 1990), a processor would typically have one floating point pipeline, with about 3 computational pipeline stages, plus typically an additional cycle for register file access. When processing Fused Multiply and Add (FMA) operations, i.e., merged floating point multiply-add high performance computation primitives, a four stage pipeline would have 4 FMA operations simultaneously in flight, each requiring 3 input registers and one output register, for a total of 16 registers to support all these computations in flight, leaving an additional 16 registers to hold other data and/or constants. Considering the parallelism provided by state-of-the-art microprocessors (e.g., the PowerPC 970 provides two floating-point pipelines) coupled with the latencies incurred by deep pipelining, a number of registers well in excess of the 32 registers provided by the PowerPC architecture are required to exploit the peak execution rate provided by a modern microprocessor.

Similarly, in that historic timeframe, a second level cache could be accessed with a 3 (processor) cycle hit latency, giving a ratio of about 10 registers per cycle of L2 cache access latency. This is a conservative measure; to express the actual amount of data required to be maintained in the register files in order to decouple memory access from computational, one would need to determine the number of operands consumed during such time, which scales up with issue width. Still, today, with a 10 to 12 cycle latency to L2, one could expect to see a requirement for 100 to 120 registers.

Large numbers of registers are in fact built, e.g., both the Power4 and Power5 microprocessors have well in excess of 32 registers. However, to exploit such larger register files, complex and area intensive renaming logic and out-of-order issue capabilities are required. Even then, the inability to express the best schedule in the program using a compiler or a skillfully tuned Basic Linear Algebra Subprogram (BLAS) or other such library limits the overall performance potential.

Some current microprocessors implement a technique called register renaming, whereby the limited number of architected registers is translated to use more registers internally. However, while this allows for an increase of the number of registers, register renaming is complex and incurs additional steps in the instruction processing of microprocessors. Thus, what is required to address the challenges in modern microprocessor design is an increased number of registers which are easy to access using an extended name space in the architecture, as opposed to techniques such as register renaming used in high-end microprocessors such as the IBM PowerPC 970 and Power5.

Recently, the IA-64 architecture and the CELL SPU architectures have offered implementations with 128 registers. In reference to these implementations, the IA-64 offers an implementation using instruction bundles, a technique to build instruction words wider than a machine word. While this resolves the issue of instruction encoding space, it leads to inefficient encoding due to a reduction of code density because an instruction word disadvantageously occupies more than a single machine word, thereby reducing the number of instructions which can be stored in a given memory unit.

Recent advances in the encoding instruction sets disclosed in the U.S. patent application to Altman et al., entitled "Method and Apparatus to Extend the Number of instruction Bits in Processors with Fixed Length Instructions in a Manner Compatible with Existing Code", U.S. patent application Ser. No. 10/720,585, filed on Nov. 24, 2003, which is commonly assigned and incorporated by reference herein, advantageously allow wide instruction words to be used in conjunction with fixed size word instruction set architectures having an instruction format requiring only a single machine word for most instructions. While this offers a significant advantage over prior wide-word bundle-oriented instruction sets in terms of code density, decoding complexity is increased.

In an advantageous implementation of fixed width 32 bit instruction words, the CELL SPU instruction set architecture supports the specification of 128 registers in a 32 bit instruction word, implementing a SIMD-ISA in accordance with the U.S. patent application to Gschwind et al., entitled "SIMD-RISC Microprocessor Architecture", U.S. patent application Ser. No. 11/065,707, filed on Feb. 24, 2005, and U.S. Pat. No. 6,839,828 to Gschwind et al., entitled "SIMD Datapath Coupled to Scalar/vector/Address/Conditional Data Register File With Selective Subpath Scalar Processing Mode", which are commonly assigned and incorporated by reference herein.

While the SPU advantageously offers the use of 128 registers in a fixed instruction word using a new encoding that, in turn, uses fields of 7 adjacent bits in a newly specified instruction set, legacy architectures are not without deficiency. For example, since many bit combinations have been assigned a meaning in legacy architectures, and certain bit fields have been aside to signify specific architectural information (such as extended opcodes, register fields, and so forth) legacy architectures offer significant obstacles to encoding new information. Specifically, when allocating new instructions, the specification for these new instructions cannot arbitrarily allocate new fields without complicating the decoding of both the pre-existing and these new instructions.

Additionally, the number of bits in instruction sets with fixed instruction word width limits the number of different instructions that can be encoded. For example, most RISC architectures use fixed length instruction sets with 32 bits. This encoding limitation is causing increasing problems as instruction sets are extended. For example, there is a need to add new instructions to efficiently execute modern applications. Primary examples are multimedia extensions such as Intells MMX and SSE2 and the PowerPC VMX extensions. Moreover, the number of cycles required to access cache and memory is growing as processor frequencies increase. One way to alleviate this problem is to add more registers to the processor to reduce the number of loads. However, it is difficult or impossible to specify additional registers in the standard 32-bit RISC instruction encoding.

The most common solution to this problem is an approach typically associated with CISC architectures, which allows multiple instruction lengths, not a fixed size such as 32 bits. This variable length CISC approach has several problems, and was one of the reasons RISC was developed in the 1980s. Among the problems with variable length CISC encoding is that it complicates instruction decode, adding pipeline stages to the machine or reducing frequency. Moreover, another problem with variable length CISC encoding is that it allows instructions to span cache line and page boundaries, complicating instruction fetch, as well as virtual address translation. Further, another problem with variable length CISC encoding is that such a CISC approach cannot be compatibly retrofitted to a RISC architecture. Most specifically, architectures having fixed length instructions today assume pervasively that all instructions are aligned on the boundary, that branch addresses are specified at a multiple of a fixed length instruction, and so forth. Further, no mechanisms are defined how to address the issue of page-spanning instructions, and so forth.

A second solution to the problem would be to switch to widening all instructions to a wider format, preferably a multiple of the original instruction set. For typical 32 bit RISC instruction sets, the next multiple is 64-bit instructions. However, if all instructions are 64-bits, approximately twice as much space as is currently used would be required to hold instructions. In addition, this would not be compatible with existing RISC code with 32-bit instructions. If 32-bit and 64-bit instructions are intermixed, the instruction set becomes CISC-like with variable width instructions, and with the associated problems just described.

Another solution to the encoding problem is employed by the IA-64 architecture from INTEL and HEWLETT PACKARD. The IA-64 packs 3 instructions in 16 bytes, for an average of 42.67 bits per instruction. This style of encoding avoids problems with page and cache line crossings. However, it "wastes" bits specifying the interaction between instructions, for example "stop bits" are used to indicate if all three instructions can be executed in parallel or whether they are to be executed sequentially or some combination of the two. The 3 instruction packing also forces additional complexity in the implementation to deal with three instructions at once. Finally, this 3 instruction packing format has no requirement to be compatible with existing 32-bit instruction sets, and there is no obvious mechanism to achieve compatibility with 32-bit RISC encodings.

All instruction bundles in this encoding are located at multiples of the bundle size.

A number of approaches have been disclosed to address this increasingly severe problem.

U.S. Pat. No. 6,157,996 to Christie et al., entitled "Processor Programably Configurable to Execute Enhanced Variable Byte Length Instructions Including Predicated Execution, Three operand Addressing, and Increased Register Space", which is incorporated by reference herein, teaches the use of a prefix byte to extend instruction semantics to include at least one of predicate information, extended register specification, and a third register operand. This implementation is undesirable for fixed instruction width RISC processors, as extension bytes cannot readily be accommodated in the instruction stream of a fixed width instruction set architecture.

U.S. Pat. No. 6,014,739 to Christie, entitled "Increasing General Registers in X86 Processors", which is incorporated by reference herein, discloses that an extra byte is extended in a variable instruction set to provide additional encoding bits. This implementation is undesirable for fixed instruction width RISC processors, as extension bytes cannot readily be accommodated in the instruction stream of a fixed width instruction set architecture.

U.S. Pat. No. 5,822,778 to Dutton et al., entitled "Microprocessor and Method of Using a Segment Override Prefix Instruction Field to Expand the Register File", which is incorporated by reference herein, discloses a microprocessor with expanded functionality within an existing variable length instruction set architecture. The control unit detects the presence of segment override prefixes in instruction code sequences executed in flat memory mode and uses prefix values to select a bank of registers. Those skilled in this and related arts will understand that the cost of decoding a prefix, determining the mode and the bank field, accompanied by fetching the instruction being modified by the prefix, incurs a significant complexity, delay and hardware inefficiency. In particular, the decoding of the prefix and bank selector has to be performed early, leading to additional complexity. In addition, prefixes cannot be readily employed in an architecture supporting only a fixed instruction word width.

Another non-transparent use of segment register override prefix bytes may be embodied within an instruction decode/execution unit. Decode/execution unit reads instructions, and operates on operands in a registers specified in the instruction. In this implementation, it is described that segment register override prefix bytes are used by a control unit to select one of multiple register banks which store the operands to be operated on by the decode/execution unit. Each register bank includes the full complement of x86 registers. In this manner, the register set of the architecture may be expanded without changing the instruction encodings. As will be appreciated by those skilled in this and related arts, a larger register set allows more operand values to be held in registers (which may be accessed quickly) and, thus, accesses to memory (which typically require a longer period of time) are lessened. In one implementation, no segment register override prefix byte is used to specify the first bank of registers, a segment register override prefix byte indicating the FS segment register specifies a second bank of registers, a segment register override prefix byte indicating the GS segment register specifies a third bank of registers, and a segment register override prefix byte indicating the ES segment register specifies a fourth bank of registers. In another implementation, the value stored within the selected segment register is used to select the appropriate register bank from numerous register banks.

In accordance with the preceding description relating to the other non-transparent use of segment register override prefix bytes embodied within an instruction decode/execution unit, all operands for a given instruction have to be retrieved from a common bank selected by the prefix selector, specified within the prefix selector in an alternate implementation. Using the segment selector as a bank selector for all operands of a given instruction is undesirable because it requires access to a control register to identify a bank, and restricts all instructions to have operands coming from just a single bank, leading to inefficient register allocation. Thus, if a common value has to be combined with other operands residing in multiple banks, copies of the common value have to be maintained, computed and updated in all banks, such that they can be combined with the other operands residing in the other banks, leading to inefficient register usage due to data duplication, and inefficient performance profile due to the duplication of work to compute the common value in all banks. It is to be appreciated that the preceding implementation has to be programmed liker a clustered machine, with distinct register files represented by the different banks.

U.S. Pat. No. 5,822,778 to Christie et al., entitled "Microprocessor and Method of Using a Segment Override Prefix Instruction Field to Expand the Register File", which is incorporated by reference herein, discloses that the prefix and the bank select are decoded first, before the instruction is actually retrieved. Then the instruction word is combined, and an access performed. In comparison, the wide select can start the access early, and decode additional information in parallel with the access cycle.

U.S. Pat. No. 5,768,574, to Christie et al., entitled "Microprocessor Using an Instruction Field to Expand the Condition Flags and a Computer System Employing the Microprocessor", which is incorporated by reference herein, discloses a microprocessor that is configured to detect the presence of segment override prefixes in instruction code sequences being executed in flat memory mode, and to use the prefix value or the value stored in the associated segment register to selectively enable condition flag modification for instructions. An instruction which modifies the condition flags and a branch instruction intended to branch based on the condition flags set by the instruction may be separated by numerous instructions which do not modify the condition flags. When the branch instruction is decoded, the condition flags it depends on may already be available. In another implementation of the referenced invention, the segment register override bytes are used to select between multiple sets of condition flags. Multiple conditions may be retained by the microprocessor for later examination. The conditions that a program utilizes multiple times in a program may be maintained while other conditions may be generated and utilized.

U.S. Pat. No. 5,838,984 to Nguyen et al., entitled "Single-Instruction-Multiple-Data Processing Using Multiple Banks of Vector Registers", which is incorporated by reference herein, discloses a digital signal parallel vector processor for multimedia applications. As disclosed therein, a single instruction multiple data processor uses several banks of vector registers. This processor uses a bank bit included in a control register to identify a primary bank, and a secondary alternate bank to be identified by a select set of instructions. This is undesirable because it requires access to a control register to identify a bank, and restricts all operations to have operands coming from just a single bank, leading to inefficient register allocation. Thus, if a common value has to be combined with other operands residing in multiple banks, copies of the common value have to be maintained, computed and updated in all banks, such that they can be combined with the other operands residing in the other banks, leading to inefficient register usage due to data duplication, and inefficient performance profile due to the duplication of work to compute the common value in all banks. It is to be appreciated that the preceding implementation has to be programmed like a clustered machine, with distinct register files represented by the different banks.

U.S. Pat. No. 5,926,646 (hereinafter the "'646 patent") to Pickett et al., entitled "Context-Dependent Memory-Mapped Registers for Transparent Expansion of a Register File", which is incorporated by reference herein, discloses a context dependent memory mapped register accessing device for transparent expansion of a register file in a microprocessor in a computer system. Therein, in-core registers are made available as a memory-mapped address space. While the adding of additional registers in the core to be referenced by the processor is allowed, the use of memory mapping has several disadvantages. Specifically, the disadvantages relate to the fact that register names can only be properly resolved after the address generation phase, as a multitude of memory address forms can refer to a memory mapped register. This will increase the latency of access to these registers to almost the latency for first level cache access. In addition, a memory-mapped register can only be referenced for those instructions that have operand forms allowing memory accesses. This typically represents only a subset of operations, and often only a subset of operands therein. This limitation is particularly severe for RISC processors, which can only reference memory operands in load and store operations, imposing the additional cost of performing copies from the memory-mapped in-core registers to computationally useable operand registers.

In other disadvantageous aspects of the '646 patent, when addresses are generated before address generation from a subset of "preferred forms", address aliasing can occur and lead to incorrect program execution. In another disadvantageous aspect of the '646 patent, when an address to such in-core register is added to a linked list, and accessed by a remote processor, this will lead to data coherence inconsistencies. Alternatively, costly methods for accessing such registers from symmetric multiprocessing (SMP) remote nodes have to be implemented and provided.

U.S. Pat. No. 6,154,832 to Maupin, entitled "Processor Employing Multiple Register Sets to Eliminate Interrupts", which is incorporated by reference herein, discloses a processor which assigns a specified register set for default task and other sets for different interrupt source. While this extends the number of registers implemented in the processor, such an approach is not suitable for the extension of the register set useable by a single process or program.

U.S. Pat. No. 5,737,625 (hereinafter referred to as the "'625 patent") to Jaggar, entitled "Selectable Processing Registers and Method", which is incorporated by reference herein, discloses a high performance memory register selection apparatus which has a controller responding to a selection-word to control a circuit to select registers depending on the control field of a word and the prior register selection. This is limited in that only the architected set of prior art registers can be accessed at any one time, thereby not making more than the number of prior art registers available at any one time.

In another disadvantageous aspect of the '625 patent, additional instructions are required in the instruction stream to update the control word. In typical implementations, these updates will have to be made context synchronizing, i.e., no operations before the update may have outstanding references, nor can any instruction occurring in the instruction stream be dispatched until the control register update has completed. In one non-synchronizing aspect of an implementation, multiple rename versions of the control register have to be maintained, disadvantageously leading to design complexity, and high area and power usage.

U.S. Pat. No. 5,386,563 to Thomas, entitled "Register Substitution During Exception Processing", which is incorporated by reference herein, discloses a data processing system operable in either main or exception processing mode. In accordance with the invention, the CPU restores data stored in a saved processing status register, to another register upon leaving exception-processing mode. While this extends the number of registers implemented in the processor, this is not suitable for the extension of the register set useable by a single process or program.

Microcode used for implementing microprocessor ISAs using internal layering has used a variety of formats, using contiguous or non-contiguous fields. None of these were concerned with the maintenance of cross-generational compatibility or programming orthogonality. In general, microcode has different requirements, and methods from microcode are recognized to not be applicable to architected instruction sets by those skilled in this and related arts due to issues related to the internal representation, requirements for compatibility, decoding of instructions and detection of data and structural hazards (which are not supported in the restricted microcode programming model), as well as the need of maintaining compatible across generations of a design.

Prior art instruction sets have offered the use of non-contiguous immediate constants, e.g., as disclosed by Moreno et al., in "An innovative low-power high-performance programmable signal processor for digital communications", IBM Journal of Research and Development, Vol. 47, No. 2/3, 2003, which is incorporated by reference herein, to allow extended immediate specifications in bundle encodings, but do not address the encoding of non-contiguous fields in a fixed width instruction. The issues for immediate operand and similar fields are different because they do not require any early steering and access to determine dependences, access of register files, and so forth. In particular, this also has not required advanced decoding and/or register file access implementations. Thus, while constants have been encoded in non-contiguous ways in bundle instruction sets, the encoding of non-contiguous register file specifiers in fixed width instruction sets have eluded the inventors of this and other instruction sets.

SUMMARY

The present invention is directed to implementing instruction set architectures with non-contiguous register file specifiers. Moreover, the present invention provides an optimized processor structurally adapted to the optimized processing of a fixed width instruction set with a non-contiguous register specification.

According to an aspect of the present invention, there is provided a method for processing instruction code. The method includes processing a fixed-width instruction of a fixed-width instruction set using a non-contiguous register specifier of a non-contiguous register specification, wherein the fixed-width instruction includes the non-contiguous register specifier.

According to another aspect of the present invention, there is provided a method for register renaming in an out-of-order processor. The method includes translating at least one of a plurality of non-contiguous register specifiers included in a fixed-width instruction set into a contiguous logical register specifier. The method further includes remapping a logic register name to a physical register using the contiguous logical register specifier, wherein the logic register name is specified in the fixed-width instruction set using non-contiguous fields.

According to yet another aspect of the present invention, there is provided a computer program product comprising a computer usable medium having computer usable program code for register renaming in an out-of-order processor. The computer program product includes computer usable program code for translating at least one of a plurality of noncontiguous register specifiers included in a fixed-width instruction set into a contiguous logical register specifier. The computer program product further includes computer usable program code for remapping a logic register name to a physical register using the contiguous logical register specifier, wherein the logic register name is specified in the fixed-width instruction set using non-contiguous fields.

These and other objects, features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIGS. 1A, 1B, and 1C are diagrams illustrating exemplary instruction encodings with an extended VMX specification, in accordance with an embodiment of the present invention;

FIGS. 2A, 2B, 2C, and 2D are diagrams illustrating exemplary instruction encodings in an architecture specification having 64 registers, in accordance with an embodiment of the present invention;

FIGS. 11A-11C are diagrams illustrating VMX instruction encodings in accordance with the prior art;

FIGS. 12A and 12B are diagrams illustrating the alignment of 5 bit register operand registers with 7 bit register operand specifiers in accordance with the prior art and an embodiment of the present invention, respectively;

DETAILED DESCRIPTION OF PREFERRED EMBODIMENTS

Figure 3A:
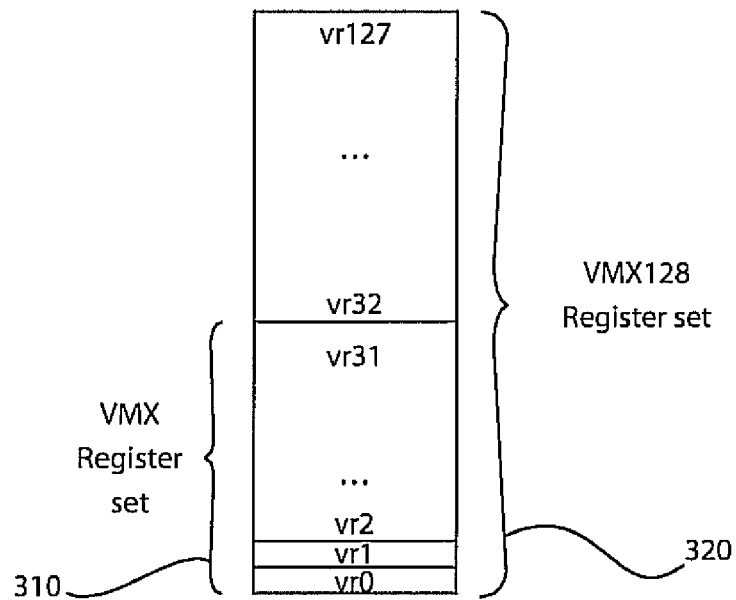
FIG. 3A is a diagram illustrating an exemplary vector media extension register file in accordance with an embodiment of the present invention offering an extension of the standard VMX register file to an extended 128 register file set.

The present invention is directed to implementing instruction set architectures with non-contiguous register file specifiers.

It should be understood that the elements shown in the FIGURES may be implemented in various forms of hardware, software or combinations thereof. Preferably, these elements are implemented in software on one or more appropriately programmed general-purpose digital computers having a processor and memory and input/output interfaces.

Embodiments of the present invention can take the form of an entirely hardware embodiment, an entirely software embodiment or an embodiment including both hardware and software elements. In a preferred embodiment, the present invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to FIGS. 1A, 1B, and 1C, there are shown exemplary optimized encodings in accordance with an embodiment of the present invention. That is, FIGS. 1A-C illustrate format specifications for an exemplary VMX128 specification. In accordance with the encodings, a VMX2 instruction set with 128 registers (VMX128) is supported.

In FIG. 1A-1C, the following instruction fields are used:

| | |
|---|---|
| OPCD | primary opcode |
| XO | extended opcode |
| RA | general purpose register specifier RA |
| RB | general purpose register specifier RB |
| UIM | unsigned immediate constant specifier |
| SIM | signed immediate constant specifier |
| SHB | immediate constant specifier |
| Rc | record-bit indicator |
| VA | vector register specifier field |
| A | (extended) vector register specifier Field |
| VB | vector register specifier field |
| B | (extended) vector register specifier Field |
| VC | vector register specifier field |
| C | (extended) vector register specifier Field |
| VS | vector register specifier field |
| S | (extended) vector register specifier Field |
| VT | vector register specifier field |
| T | (extended) vector register specifier Field |
| / | unused field indicator (reserved for future use) |

Referring now to FIGS. 1A-C, there are shown format specifications for the VMX128 specification. In accordance with the VMX12B specification, there are provided novel and improved instruction encodings, namely X2-Form 100 (FIG. 1A), VA2-Form 120 (FIG. 1B), and VX2-Form 140 (FIG. 1C), providing instruction encodings supporting extended register specifier fields.

Referring now FIG. 1A, and more specifically, the encoding of the X2 instruction format, the X2 form 100 offers two general purpose register slots, and a single vector source VS or vector target VT specifier for 128 registers encoded using a non-contiguous register specifier field in bit fields 6 to 10, and bits 28 and 29.

The X2 form 100 is used for memory access, such as lvx128, stvx128, load vector element lvewx128, load vector element stvewx128, load and store vector left, load and store vector right, as well as variants thereof. The X2 form 100 can optionally also be used to encode memory access-related instructions if such instructions are to be supported with an extended register specification.

Referring now to FIG. 1B, and more specifically, the variants of encoding of the VA2 form 120, there is shown a four vector register operand instruction form, having one 7 bit target register specifier, encoded using a non-contiguous register specifier field in bit fields 6 to 10, and bits 28 and 29, allowing to select one of 128 registers as target register, and three source register specifiers. A first and second register operand are specified as having 7 bit source register specifiers, to independently select one of 128 registers as each source operand register, and a third register specifier, using a 3 bit specifier, allowing to select one of 8 registers as third input operand.

According to the encoding shown in the VA2 form 122, the three source operands are encoded as follows (using the symbol | to denote the concatenation operator for bit strings).

A first 7 bit register operand specifier VRA is formed by concatenating a first 1 bit field VAX0 (bit 21 of encoding 122), a second 1 bit field VAX1 (bit 26 of encoding 122), and a 5 bit specifier field VA (bits 11 to 15 of encoding 122), to form an extended specifier VRA=VAX0|VAX1|VA.

A second 7 bit register operand specifier VRB is formed by concatenating a two bit specifier field VBX (bits 30 and 31 of encoding 122) with a 5 bit specifier field VB (bits 16-20 of encoding 122), to form an extended specifier VRB=VBX|VB.

A third register operand specifier VRC is extracted from 3 bit field VC wherein the specifier bits of the 3 bit VC field (bits 23 to 25 of encoding 122) are advantageously aligned with the low-order 3 bits of specifier VC of encoding form 1130 (representing the VMX VA encoding format) of FIG. 11B in accordance with the VMX specification. In accordance with the extended register specification, to allow the VRC operand to address one of vector registers 0 to 7, the extended specifier VRC is created by concatenating with a string of "0000" using the logic equation VRC="0000"|VC.

In accordance with the VMX128 specification, encoding form 122 is used to encode a vperm128 instruction, specifying one of 128 register targets for a permuted result, two of 128 vector registers providing the vector data to be permuted, and one of 8 registers to specify the permutation control word.

According to FIG. 1B, there is also specified an encoding form 124 with a 7 bit vector register target, two independent 7 bit vector register source operands, and a 4 bit immediate field (bits 22 to 25 denoted "SHE" in encoding 124), to encode shift operations operating on the concatenation of two vector registers, such as the vsldoi128 instruction.

Referring now to FIG. 1C, there are shown variants of the VX2 encoding form 140. The VX2 encoding form 140 is used to provide the generalized VMX2 operation repertoire using 3 non-contiguous register specifiers, to specify a single 7 bit target register specifier, and two 7 bit source operand register specifiers.

According to the encoding form 140, the three source operands are encoded as follows (using the symbol | to denote the concatenation operator for bit strings).

A 7 bit target register specifier is encoded using a non-contiguous register specifier field in bit fields 6 to 10, and bits 28 and 29, allowing for the selection of one of 128 registers as a target register.

A first 7 bit source register operand specifier VRA is formed by concatenating a first 1 bit field VAX0 (bit 21 of encodings 141 and 142), a second 1 bit field VAX1 (bit 26 of encodings 141 and 142), and a 5 bit specifier field VA (bits 11 to 15 of encodings 141 and 142), to form an extended specifier VRA=VAX0|VAX1|VA.

A second 7 bit register operand specifier VRB is formed by concatenating a two bit specifier field VBX (bits 30 and 31 of encodings 141, 143, 146, 147, 148, 149, 150, 151, and 152) with a 5 bit specifier field VB (bits 16-20 of encodings 141, 143, 146, 147, 148, 149, 150, 151, and 152), to form an extended specifier VRB=VBX|VB. In accordance with encoding 142, the second specifier is labeled VCX for consistency with other instructions used in the VMX instruction set.

Referring now to FIGS. 2A, 2B, 2C, and 2D, there are shown alternate exemplary optimized encodings in accordance with an embodiment of the present invention. In accordance with these encodings, a VMX2 instruction set with 64 registers (VMX64) is supported.

FIGS. 2A-D illustrate format specifications for an exemplary VMX64 specification. In accordance with the VMX2 specification and the VMX64 set, there are provided novel and improved instruction encodings, labeled X2-Form 200 (FIG. 2A), VA2-Form 220 (FIG. 2B), a VX2-Form 240 (FIG. 2C), and a form 260 (FIG. 2D) providing instruction encodings supporting extended register specifier fields to encode up to 64 registers.

In FIG. 2A-2D, the following instruction fields are used:

| | |
|---|---|
| OPCD | primary opcode |
| XO | extended opcode |
| RA | general purpose register specifier RA |
| RB | general purpose register specifier RB |
| UIM | unsigned immediate constant specifier |
| SIM | signed immediate constant specifier |
| SHB | immediate constant specifier |
| Rc | record-bit indicator |
| VA | vector register specifier field |
| A | (extended) vector register specifier Field |
| VB | vector register specifier field |
| B | (extended) vector register specifier Field |
| VC | vector register specifier field |
| C | (extended) vector register specifier Field |
| VS | vector register specifier field |
| S | (extended) vector register specifier Field |
| VT | vector register specifier field |
| T | (extended) vector register specifier Field |
| / | unused field indicator (reserved for future use) |

Referring now FIG. 2A, and more specifically, the encoding of the X2 instruction format 200, the X2 form offers two general purpose register slots, and a single vector source VS or vector target VT specifier for 64 registers encoded using a non-contiguous register specifier field in bit fields 6 to 10, and bit 30. In accordance with this format, a 6 bit register specifier VRS and VRT, respectively, is formed by concatenating the two bit fields, e.g.:

*VRS=S|VS*

*VRT=T|VT*

The X2 form is used for memory access, such as lvx64, stvx64, load vector element lvewx64, load vector element stvewx64, load and store vector left, load and store vector right, as well as its variants. This form can optionally also be used to encode memory access-related instructions if such instructions are to be supported with an extended register specification.

Referring now to FIG. 2B, and more specifically, the encoding of the VA2 instruction form 220, there are shown two four operand vector instruction forms, 222 and 224.

In accordance with an exemplary embodiment, one encoding 222 encodes a four vector register operand instruction form, having one 6 bit target register specifier, encoded using a non-contiguous register specifier field in bit fields 6 to 10, and bit 30 (VRT=T|VT), allowing for the selection of one of 64 registers as a target register, and three source register specifiers, VRA, VRA, and VRB. In accordance with an exemplary embodiment, specifier VRA is encoded using a non-contiguous register specifier field in bit fields 11 to 15, and bit 28 (VRA=A|VA); specifier VRB is encoded using a non-contiguous register specifier field in bit fields 16 to 20 and bit 29 (VRB=B|VB); and specifier VRC is encoded using a non-contiguous register specifier field in bit fields 21 to 25 and bit 31 (VRC=C|VC).

In accordance with another encoding 224, there are specified registers VRT, VRA, and VRB, and an immediate field. The 4 bit immediate field (bits 22 to 25 denoted "SHB") can be used to encode shift operations operating on the concatenation of two vector registers, such as the vsldoi128 instruction. Additional unassigned bits may optionally be used as extended opcode XO.

Referring now to FIG. 2C, there are shown variants of the VX2 encoding 240. The VX2 encoding form is used to provide the generalized VMX64 operation repertoire using 3 non-contiguous register specifiers, to specify a single 6 bit target register specifier, and two 6 bit source operand register specifiers.

A 6 bit target register specifier is encoded using a non-contiguous register specifier field in bit fields 6 to 10, and bit 30, allowing for the selection of one of 64 registers as a target register (VRT=T|VT).

A first 6 bit source register operand specifier VRA is formed by concatenating a first 1 bit field A (bit 28 of exemplary encoding 240), and a 5 bit specifier field VA (bits 11 to 15), to form an extended specifier VRA=A|VA.

A second 6 bit register operand specifier VRB is formed by concatenating a one bit specifier field B (bit 29 of encoding 240) with a 5 bit specifier field VB (bits 16-20 of encoding 240), to form an extended specifier VRB=B|VB.

In accordance with a VMX64 specification, at least one register source operand may optionally be replaced by an immediate field (SIM, and UIM, respectively), an extended opcode specification (XO), or an un-decoded field (denoted with the "/" symbol).

Referring now to FIG. 2D, there is shown a vector instruction encoding form 260. Instruction form 260 is similar to instruction form 240, but includes a record bit Rc to indicate the recording of condition code information if the record bit field Rc is set to "1".

While it may appear desirable to extend the entire repertoire of operations, conservation of encoding space in the instruction set may dictate a careful selection of which instructions to support with an extended register specification.

Thus, an extended specification may have constraints on register operand usage, wherein some operations can be used in instructions which access the entire set of 64 registers as their operands, and other operations may only be used in their original instruction form (supporting only the complete non-extended set of 32 registers, vr0 to vr31). In an embodiment, the original instruction forms for addressing the complete set of 32 registers are always available for all operation forms, to ensure binary compatibility at the architecture level.

Referring now to FIG. 3A, an extended register set is expressed as a superset of an original register set, extending the number of registers but including all previously defined registers. Thus, in accordance with an extended register specification, an original register set is extended to include additional registers.

In the exemplary embodiment of FIG. 3A, wherein a VMX architecture specification is enhanced with an extended register specification, there is shown the extension of VMx registers from a first, original VMX register set 310 to a second VMX128 register set 320.

Figure 3B:
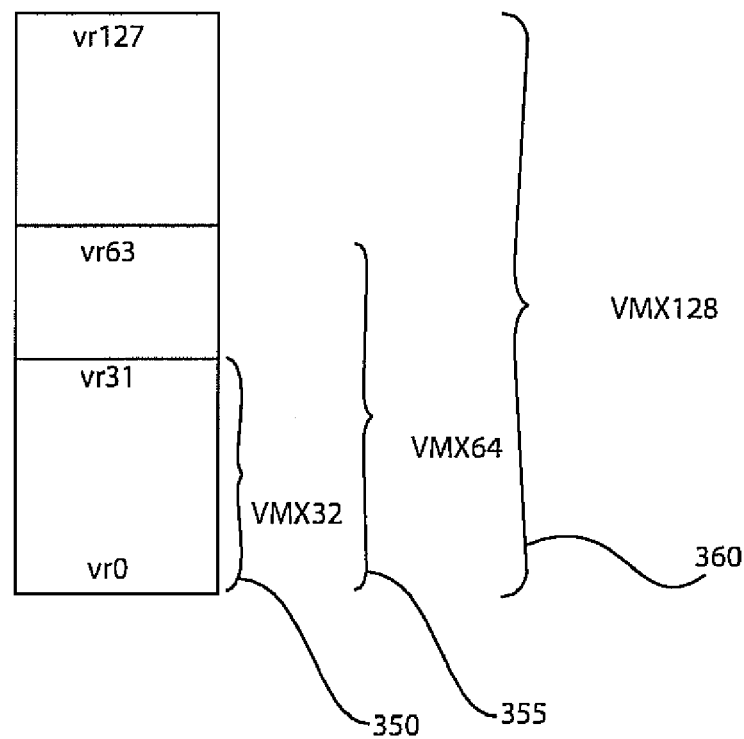
FIG. 3B is a diagram illustrating exemplary multiple register set sizes supported in a single instruction set specification, in accordance with an embodiment of the present invention.

Referring now to FIG. 3B, in another embodiment relating to register file extensions, a microprocessor can have a range of extended register file specifications, differing in the number of registers supported.

The embodiment of FIG. 3B relates to an extended register specification for the Power Architecture vector media extensions. There are shown multiple extension options for an architecture specification, such as a base VMX32 register set 350, a second VMX64 register set 355, and a third VMX128 register set 360. In one such specification, instruction formats between a VMX64 and VMX128 register specification are coordinated to align like bit fields between the specifications (e.g., a $6^{th}$ register specifier bit is in the same position for a 64 bit specification and a 128 bit specification regardless of the presence or absence of a $7^{th}$ bit).

In an embodiment relating to register file extensions, the microprocessor supports the configuration of the available register file space using a software-controlled configuration register, wherein the supported register set is selected by writing to configuration registers. This may be used to ensure compatibility with legacy specifications.

In another embodiment relating to register file extensions, the size of the register file is set at manufacturing time using a micro fuse. A micro fuse is a device which can be configure to give a logic value of "0" or "1" during initial product configuration time by the manufacturer, but is later unchangeable in the field. This allows for the customization of products for specific target markets. Such customization may relate to, but is not limited to, specific architecture compliance requirements by a manufacturer at product manufacturing time. In one optimized use of on-chip fuses, a first section of the register file is selected to provide a chip compliant with a 32 register architecture specification, when at least one other section of the register file exhibits a manufacturing defect and cannot be used to support architecture compliance with an extended register specification.

In yet another embodiment relating to register file extensions, the register file size is decided at implementation time, or is modular to optimize for different market requirements.

Figures 4A, 4B:
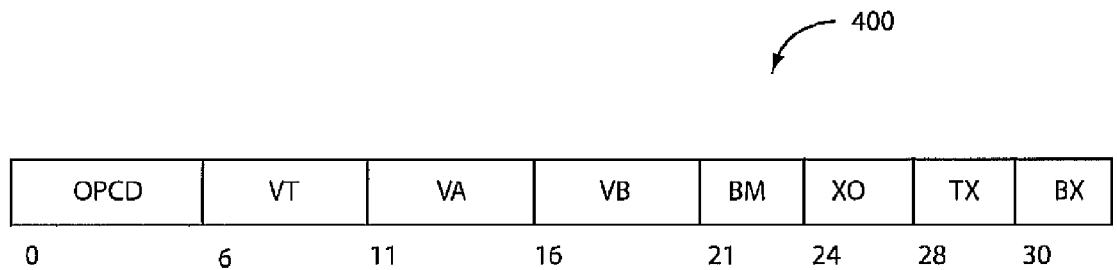
FIG. 4A is a diagram illustrating an exemplary format for an instruction which utilizes sufficient XO bit patterns that no two bits are unassigned and thus available for use as an AX field, in accordance with an embodiment of the present invention.
FIG. 4B is a diagram illustrating exemplary encodings of XO field illustrating use of each XO bit in at least one instruction, and the opportunity to add selected extended instructions which exploit a larger register file, by a deep encoding of the AX field (within the XO field), in accordance with an embodiment of the present invention.

Referring to FIGS. 4A and 4B, an exemplary encoding format 400 and exemplary encodings 450 are shown in accordance with embodiments of the present invention. FIGS. 4A and 4B are directed to the situation where an instruction encoding may not provide sufficient freedom (i.e., unassigned bits within the allocated extended opcode patterns) to assign sufficient bits for all the extended register specified sub-fields.

In the example of FIG. 4A, a contiguous unassigned bit range is available and has been allocated to non-contiguous register specifier fields TX and BX subfields. However, no unassigned bit range is available to encode a third non-contiguous register specifier field for Ax in order to extend the register specification for the VA register.

In accordance with one exemplary encoding of non-contiguous register specifiers, as shown in FIG. 4B, the currently assigned extended opcode fields utilize, in at least one assigned instruction, each of the bits in the XO field. However, some selected members of the instruction set can still be extended to operate on the larger register space by utilizing a "deep encoding" of the register extension sub-field throughout the space of the extended opcodes. As indicated in FIG. 4B, a deep encoding is achieved by allocating multiple opcode points (or extended opcode points) to indicate a specific instruction, wherein each opcode point further indicates the use of a specific bit string as an extended register specifier.

In FIG. 4B, there are shown a first primary opcode (labeled OPCD) 462, a second extended opcode (labeled XO) 464, and a third field labeled mnemonic 466. The third field indicates both a semantic meaning to a specific opcode pattern, and an optional non-contiguous register specifier (indicated by the use of a specific opcode and extended opcode). In this particular example, the vector add under immediate mask (where the add results are written selectively into the target register under the control of the BM mask, on a per-word basis) has been extended to the 128-register space, as has the vector select under mask instruction (which selects from input register operand A or B and inserts into the target according to the control mask BM). In each case, the AX value has been encoded into the XO field (in both cases effectively by taking the lower 2 bits of the extended op XO field when the appropriate instruction is decoded).

In cases where such a deep encoding of a register extension specifier sub-field is employed, the instruction decode process is more complicated, as the decoder has to determine the full opcode and extended opcode to identify how to extract the deeply encoded register extension sub-field. In accordance with the teachings provided herein regarding the use of deep encodings of non-contiguous register fields, a larger subset of the original instructions can be extended by using these advanced encoding techniques.

Figure 5:
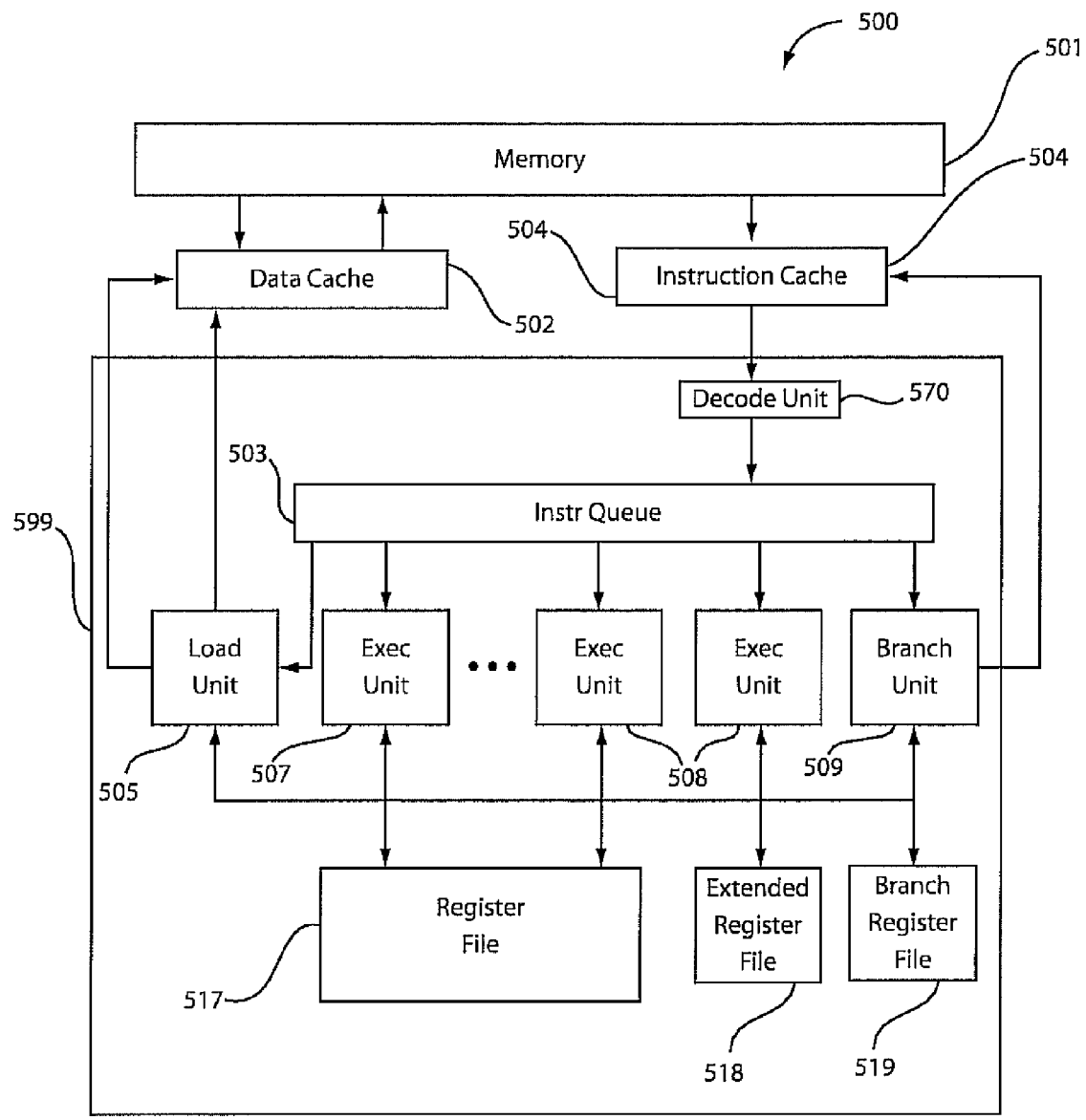
FIG. 5 is a diagram illustrating an exemplary microprocessor implementing at least one unit with an extended register specification in accordance with an embodiment of the present invention.

FIG. 5 illustrates a system 500 having a processor unit 599 that is provided with an execution unit coupled to an extended register file to support the execution of instructions with an extended register file specification in a fixed instruction word using non-contiguous register specification fields as described above. The system 500 includes a memory subsystem 501, a data cache 502, an instruction cache 504, and the processor unit 599. The processor unit 599 includes: an instruction queue 503; one or more load units 505 (one shown); several execution units 507, that perform integer and logic operations; an execution unit 508, which can access an extended register file using the specification; a branch unit 509; and register files 517, 518 and 519. Instructions are fetched from the instruction cache 504 (or the memory subsystem 501, if not in the instruction cache 504) under the control of the branch unit 509, and are placed in the instruction queue 503. Instructions are decoded and dispatched in accordance with the exemplary methods of FIGS. 12 and 13 from the instruction queue 503 to the load unit(s) 505, execution units 507, execution unit 508, and branch unit 509 for execution. These units interact with the register files 517, 518 and 519 to access the operands used by the instructions and save the results produced by the execution of the instructions. The register files typically includes general-purpose registers 517 (GPRs), and branch-related registers such as link (LRs), count (CTRs) and condition registers (CRs) 519. Extended register file 518 is accessed with a wide register specifier. The load unit(s) 505 also interacts with the data cache 502 and the memory subsystem 501, to load data used by the instructions that are executed by the execution units 507 and/or execution unit 508 and/or branch unit 509, and to store results generated by the execution units.

In an embodiment, the unit with an extended specification is a vector media extension. In another embodiment, the floating point architecture is extended. In yet another embodiment, the integer architecture is extended to support an increased number of registers.

According to the present invention, as shown in FIG. 5, in a first mode of operation, the decode unit 570 decodes instructions in accordance with a prior art specification of registers specifying a subset of the register set available in the extended specification. To provide a full address, the obtained specifiers will have to be extended, typically by appending 0 bits. In other embodiments, these may be "1" bits, or copies of the most significant bit of the register specifier, or any other bit, such as, but not limited to, a bit specified in a software-controlled configuration register or some other bit. In a second mode of operation, the decode unit 570 decodes instructions using an extended specification as described herein. This is achieved by extracting multiple fields, and merging the extracted fields to form the full extended register specification, in accordance with the foregoing descriptions. In the simplest form, these extended register specifiers are simply extracted from the instruction words fully at the decode unit 570, as described in FIG. 13B in exemplary fashion, where the individual subfields of the full extended register specifier are routed to their appropriate locations. In the case of deeply encoded extended register specifiers, the routing of the extended register specifier bits will be more complicated than that shown in FIG. 13B, and depend on the decoding of the opcode and extended opcode. With complex encodings or a sufficient number of such re-routings, the decode unit's increased complexity may require additional computation, potentially resulting in a larger number of clock cycles devoted to this decode process (per instruction execution).

There are several possible implementation options which can provide greater performance potential or more efficient implementations than the naïve approach of employing a full aggregation of all extended register specifier bits within the decode unit at full decode time.

Figure 6:
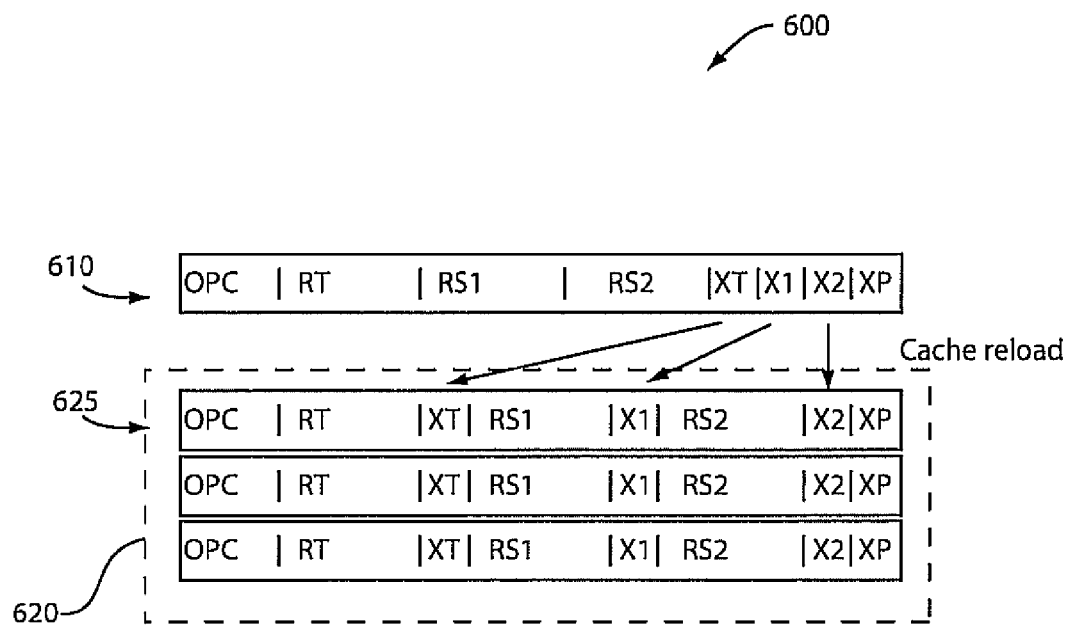
FIG. 6 is a diagram illustrating an exemplary speculative redistribution and merge of extended register specifier bits within the instruction cache, in accordance with an embodiment of the present invention.

Referring now to FIG. 6, there is shown an exemplary apparatus 600 using a structurally adapted layout of instructions in accordance with an embodiment of the present invention.

In accordance with this embodiment, the encoding of an instruction word 610 is illustrated where the positioning of the extension sub fields is largely independent of the opcode. In this exemplary encoding, the position of the XT, X1 and X2 fields is consistent across the instruction encodings, but in some cases these bits are not used to specify extended register specifiers (e.g., in the legacy instructions).

In accordance with a speculative embodiment, instruction word 610 is reformatted into internal format 625 when the instruction word is reloaded into the instruction cache 620. In one exemplary structurally adapted format, the XT, X1 and X2 fields are speculatively re-positioned to store contiguous specifiers in the instruction cache.

This re-alignment into the instruction cache, which generally occurs only under the operation of a long-latency cache miss operation, allows the bits to be re-routed at no apparent cost to the processor core. For those legacy operations which only use a 5-bit register specifier, very simple logic in the decode unit can mask off the extension bits (rerouted when the instruction was read into the instruction cache).

Those skilled in this and related arts will understand that any storage structure, such as trace cache, instruction register, and so forth, can be used to store a structurally adapted format in accordance with the teachings of the present invention.

There are some significant challenges associated with both large register files and with non-contiguous extended register file specifiers. Large register files require more physical area and, thus, present longer wire paths, higher wire loads, and so forth. In many cases, it would be advantageous to break a large monolithic register file into smaller sub-files (or banks) that can then be implemented advantageously in more diverse forms, e.g. to allow wiring tracks between banks, or to limit the number of registers that have to be powered in a given cycle.

Referring to the implementation of architectures with an extended register specification, a number of additional structurally adapted embodiments of microprocessors supporting the execution of instructions with non-contiguous register files are disclosed.

In some specifications, the non-contiguous specifier can be placed uniformly within the instruction word, always occurring in the same locations, regardless of the opcode. In this case, as described above, the instruction word can be advantageously reorganized by routing the extension specifiers into the relevant locations as the instructions are read into the instruction cache (see FIG. 6).

However, in some embodiments, the extension of a pre-existing instruction set will not provide the opportunity to specify all register extension bits in identical locations for all instruction forms regardless of opcode, but instead require format specific fields, or fields encoded as part of an extended opcode using a deep encoding in accordance with FIGS. 4A and 4B. In such embodiments, the selection and routing of the register specifier extension bits will require some decoding of the opcode and/or extended opcode to determine which bits are to be combined with the legacy register specifier bits.

In such cases, where the location of the extended register specifier sub-fields involves some decoding of the instruction, some instructions may have to use a fairly deep decoding of both the primary and secondary opcodes to identify if a secondary register specifier is present. This can be true both of legacy instructions where there are no extended register specifier sub-fields, and in cases such as described in FIG. 4B where the extended register specifier sub-field is encoded within the extended opcode field. The use of a deep decoding of the instruction opcode and extended opcode in order to determine the location of all register specifier bits (i.e., whether there is an extended register specifier sub-filed and, if so, where does it reside in the instruction word) and then to route these bits together to form a unified, full extended register specifier will increase the latency of register file access by adding the delay to form the extended register specifier. Thus, it is desirable to offer implementations which can initiate accesses with a subset of known register specifier bits, while the remaining specifier bits are extracted, computed and/or routed.

Figure 7:
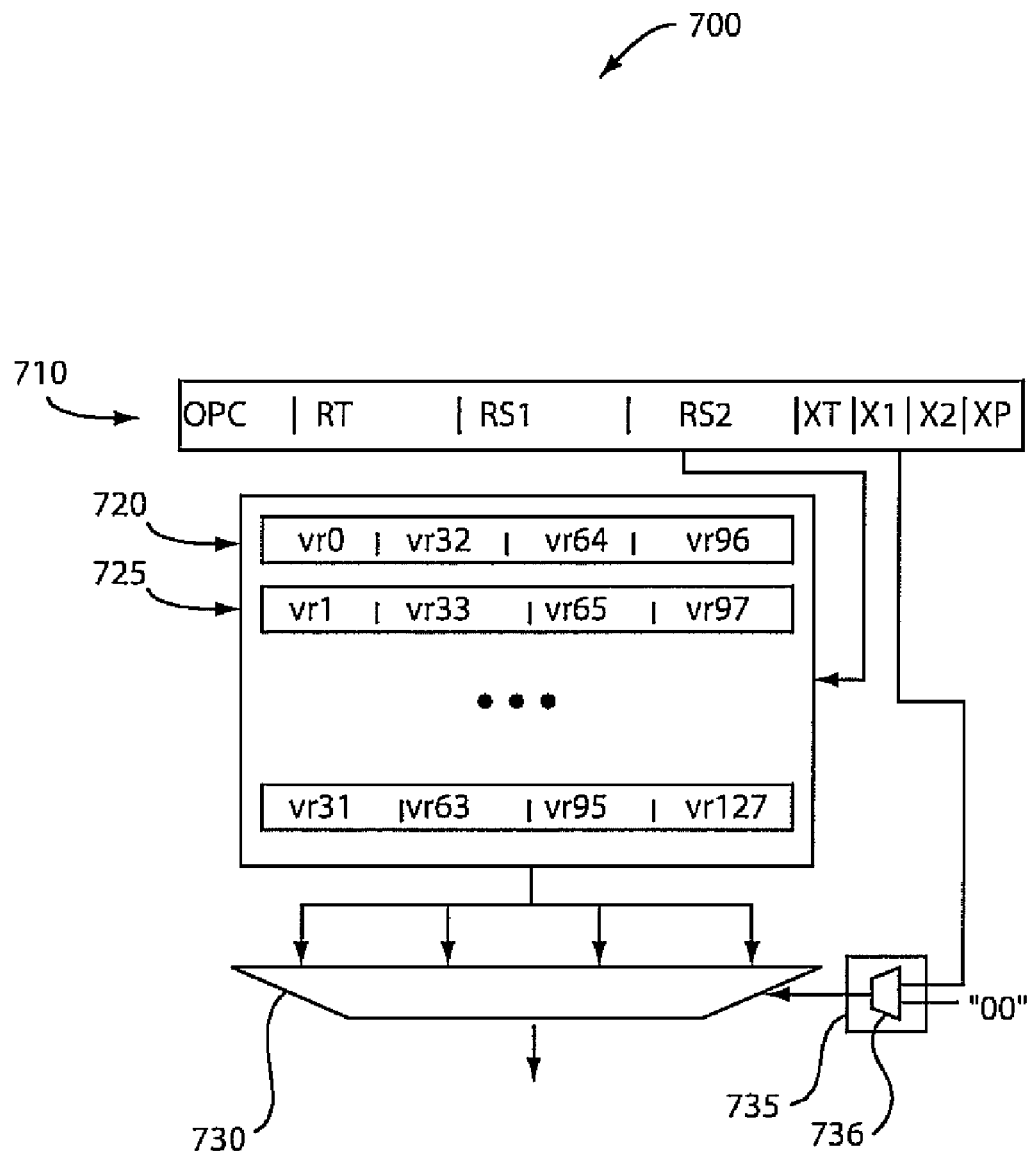
FIG. 7 is a diagram illustrating an exemplary late select in a wide register file, in accordance with an embodiment of the present invention.

Referring now to FIG. 7, there is shown an exemplary apparatus 700 for providing two-phase register file access. In the first phase, the register file is accessed using the legacy (5-bit) register specifier. This initial access is used to select a subset of the extended register file array, and the subsequent application of the extended register file sub-field (at a later time) is used to select the exact register from this pre-selected subset. This two-phase access pattern has several advantages, such as allowing the access to start early, and providing a smaller subset of the full register file to be driven by the later-available selection signal (from the extension sub-field). By providing a smaller subset for the final select, the final select can operate faster, the early select can be used to reduce the number of banks excited in the selection process (saving power) and the overall access can occur faster (at least in a throughput pipelined sense) than when the full extended register specifier is first assembled and then applied as in traditional register files.

In accordance with apparatus 700, an instruction 710 is decoded to read-access at least on a register in register file 720. Register file 720 is configured to access a plurality of registers 725 indicated by a first portion of a register specifier extracted from an instruction word 710.

Logic 735 generates a second portion of the register specifier in parallel with the initial register file access. In one exemplary embodiment, logic 736 includes a multiplexer 736 to select one of a non-contiguous extended register file specifier from the instruction word (corresponding to an instruction encoding such specifiers) and a default value (corresponding to the value substituted for instructions not specifying the extended specifier, and shown as "00", in the present exemplary embodiment) under control of the instruction opcode and optionally additional configuration information.

Selection logic 730 uses the second register specifier generated by logic 735 to select one from the plurality of entries returned from the initial first phase access to register file 720.

Advantageously, the two-phase access of FIG. 7 overcomes deficiencies in the prior art. Wherein the prior art employs operand banks and restricts all operands to be from the same bank, no such restrictions are posed by the current invention. Secondly, whereas the prior art requires a bank number to be pre-computed (either in a control register previously configured as described in above-referenced U.S. Pat. No. 5,838,984 to Nguyen, or a prefix previously decoded as described in above-referenced U.S. Pat. No. 5,822,778 to Dutton et al.), no such pre-computation is necessary in the current invention.

Referring now to other aspects of microprocessor design impacted by the use of non-contiguous register specifiers, and specifically dependence checking between instructions in an instruction stream, it is desirable to reduce performance penalties associated with the use of the non-contiguous specifiers. In state of the art implementations, the dependence check is performed by comparing the source and target operand registers of groups of instructions to find cases where the same register specifiers are referenced. In an embodiment with non-contiguous extended register file specification sub-fields, such checks would need to be delayed until such time as the full register specifier were assembled, which adds latency to the dependency check.

Figure 8:
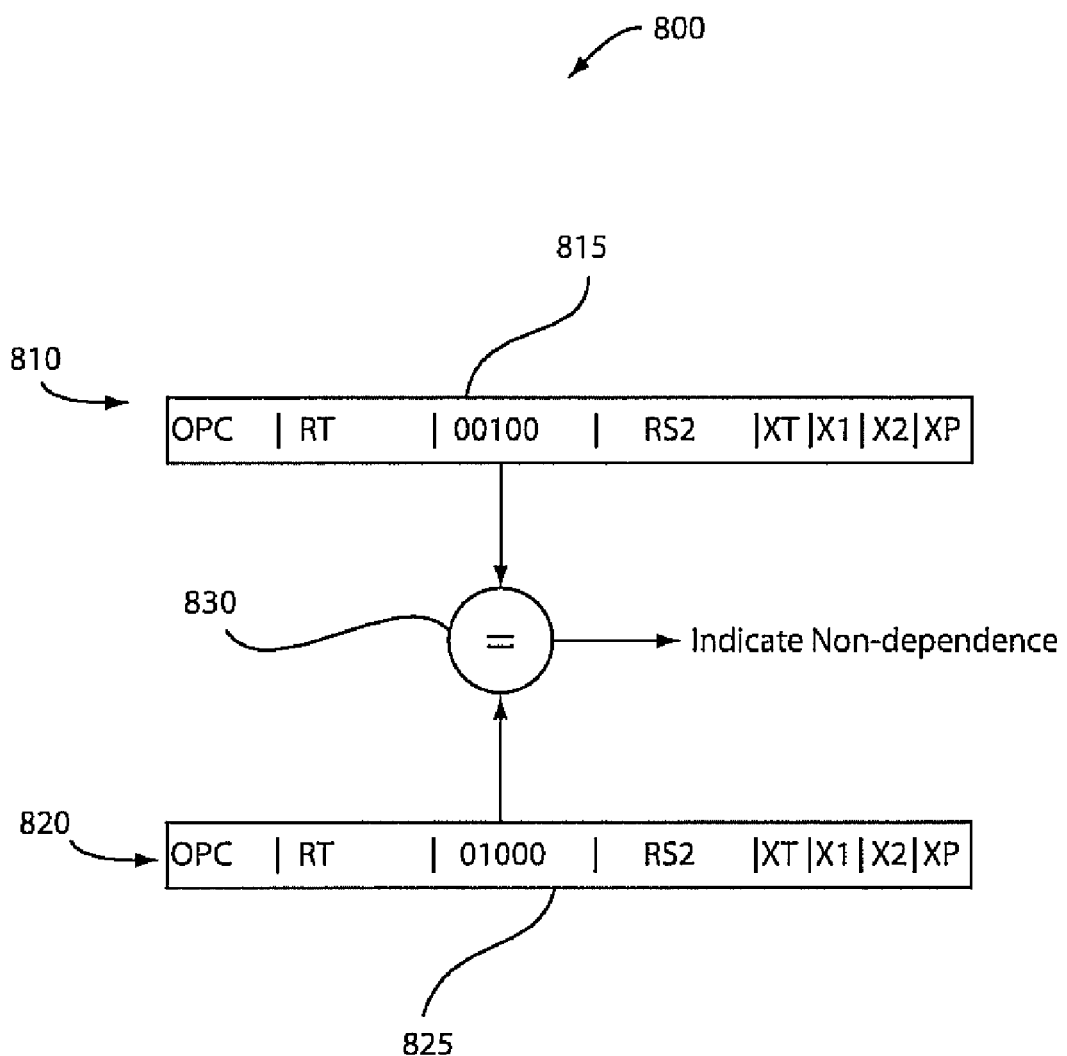
FIG. 8 is a diagram illustrating the use of partial dependence analysis to establish non-dependence for a subset of possible instruction sequences by comparing a subset of register specifier bits, in accordance with an embodiment of the present invention

Referring now to FIG. 8, there is shown an apparatus 800 for implementing efficient dependence check logic by employing a two-phase check.

A first phase conservative dependency check is performed by comparing a portion 815 of the register specifier included in a first instruction 810 with a portion 825 of an instruction 820 using comparison logic 830.

This dependency check cannot determine that two instructions are dependent, as it only compares portions of register specifiers (which might appear identical, though subsequent bits could differ), but instead is used to determine very early those cases that cannot be dependent. In any case where the compared register specifier portions 815 and 825 indicate a mismatch, there is a guarantee that those full register specifiers do not match and, thus, that there is no dependence carried through that register specifier (between those two instructions).

In this manner, all cases of non-dependence that can be distinguished based solely on a portion of the register specifier can then be eliminated from further consideration. In one embodiment, register specifier portions 815 and 825 correspond to the register specifier in a legacy instruction set prior to instruction extension.

In the case where this eliminates all possible dependence, dependency checking can be concluded at this point. For those cases where potential dependences still remain, subsequent checks using the extension specifier bits can be used to fully determine the ultimate dependence (or non-dependence) of the instructions. In this way, many dependency checks can be resolved early and, in all cases, the sets of bits being compared can be narrowed from the full-width extended register specifiers to the maximum of any of the non-contiguous sub-fields.

A conventional implementation of a processor capable of dynamically scheduling instructions (an out-of-order issue processor) includes the following features.

A first feature is a mechanism for issuing instructions out-of-order, including the ability to detect dependencies among the instructions, rename the registers used by an instruction, and detect the availability of the resources used by an instruction.

A second feature is a mechanism for maintaining the out-of-order state of the processor, which reflects the effects of instructions as they are executed (out-of-order).

A third feature is a mechanism for retiring instructions in program order, simultaneously updating the in-order state with the effects of the instruction being retired.

A fourth feature is a mechanism for retiring an instruction in program order without updating the in-order state (effectively canceling the effects of the instruction being retired), and for resuming in-order execution of the program starting at the instruction being retired (which implies canceling all the effects present in the out-of-order state).

The third mechanism is used to retire instructions when the effects of the instruction being retired are correct. The fourth mechanism is used instead, whenever there is some abnormal condition resulting from the execution of the instruction being retired or from some external event.

Figure 9:
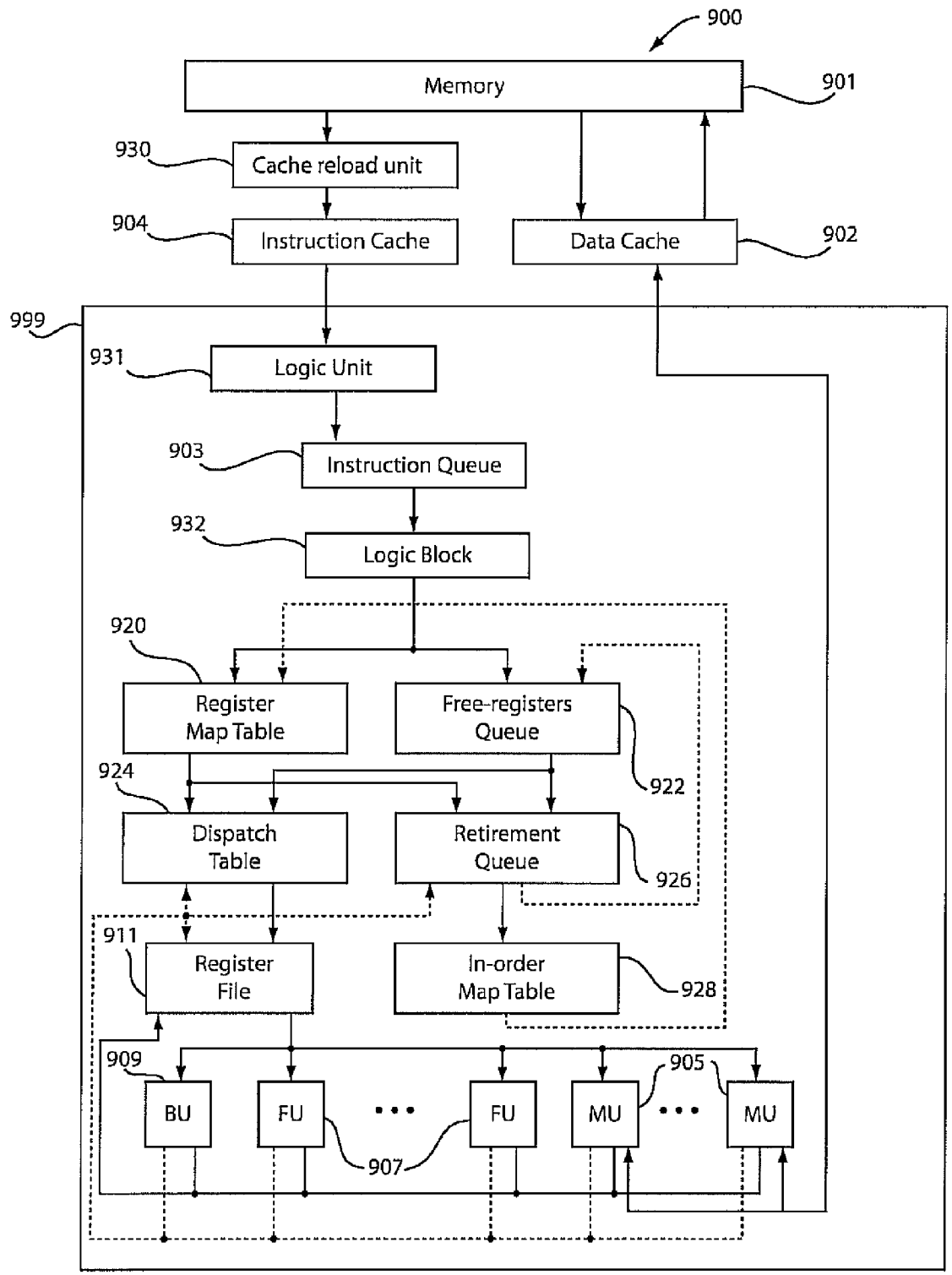
FIG. 9 is a diagram illustrating an exemplary out-of-order microprocessor, in accordance with an embodiment of the present invention.

FIG. 9 shows a system 900 having a superscalar processor unit provided with hardware to support reordering of instructions using the mechanisms listed above. Moreover, the processor 900 is capable of renaming registers within an extended register file using non-contiguous register file specifier sub-fields, in accordance with an embodiment of the present invention.

The system 900 includes a memory subsystem 901, a data cache 902, an instruction cache 904, and the processor unit 999. The processor unit 999 includes: an instruction queue 903; several memory units 905 that perform load and store operations; several functional units 1207 that perform integer, logic and floating-point operations; a branch unit 909; a register file 911; a register map table 920; a free-registers queue 922; a dispatch table 924; a retirement queue 926; and an in-order map table 928. This exemplary organization is based on the one described by M. Moudgill, K. Pingali, S. Vassilidis in "Register Renaming and Dynamic Speculation: An Alternative Approach," in Proceedings of the 26th Annual International Symposium on Microarchitecture, pp. 202-213, December 1993, which is incorporated by reference herein.

In the processor unit 999, instructions are fetched from the instruction cache 904 (or the memory subsystem 901 if not in the instruction cache) under control of the branch unit 909, and are placed in the instruction queue 903. Instructions are extracted from the instruction queue 903. The architected registers names used by the instructions for specifying the operands are renamed according to the contents of the register map table 920, which specifies the current mapping from architected register names to physical registers. The architected registers names used by the instructions for specifying the destinations for the results are assigned physical registers extracted from the free-register queue 907, which includes the names of physical registers not currently being used by the processor. The register map table 920 is updated with the assignments of physical registers to the architected destination register names specified by the instructions.

Instructions with all their registers renamed are placed in the dispatch table 924. Instructions are also placed in the retirement queue 926, in program order, including their addresses, their physical and their architected register names. Instructions are dispatched from the dispatch table 924 when all the resources used by the instructions are available (physical registers have been assigned the expected operands, and functional units are free). The operands used by the instruction are read from the register file 911, which typically includes general-purpose registers (GPRs), floating-point registers (FPRs), and Condition Registers (CRs). Instructions are executed, potentially out-of-order, in a corresponding memory unit 905, functional unit 907, or branch unit 909. Upon completion of execution, the results from the instructions are placed in the register file 911. Instructions in the dispatch table 924 waiting for the physical registers set by the instructions completing execution are notified. The retirement queue 926 is notified of the instructions completing execution, including whether they raised any exceptions. Completed instructions are removed from the retirement queue 926, in program order (from the head of the queue). At retirement time, if no exceptions were raised by an instruction: the in-order map table 928 is updated so that architected register names point to the physical registers in the register file 911 including the results from the instruction being retired; and the previous register names from the in-order map table 92B are returned to the free-registers queue 922. On the other hand, if an instruction has raised an exception: program control is set to the address of the instruction being retired from the retirement queue 926; the retirement queue 926 is cleared (flushed), thus canceling all un-retired instructions; the register map table 920 is set to the contents of the in-order map table 928; and any register not in the in-order map table 928 is added to the free-registers queue 922.

In addition to the components above, superscalar processors may include other components such as branch-history tables to predict the outcome of branches. Note that the out-of-order processor of FIG. 9 can be practiced in conjunction with the embodiment of FIG. 6, with this potential implementation expressed as cache reload unit 930. Cache reload unit 930 is placed between the memory 901 and the instruction cache 904, indicating that unit 930 rearranges the bits of instruction words as they are being transferred from the memory 901 into the instruction cache 904. In cases where the extended register specifications are used, then the re-arranging of the non-contiguous specifier sub-fields according to the principles of FIG. 6 will produce contiguous register specifiers, which can then be renamed according to prior art.

In cases where the restricted form of extended instructions required by the speculative re-arrangement of bits described in FIG. 6 is not applicable, alternative embodiments of the out-of-order processor 900 are possible.

Figure 10:
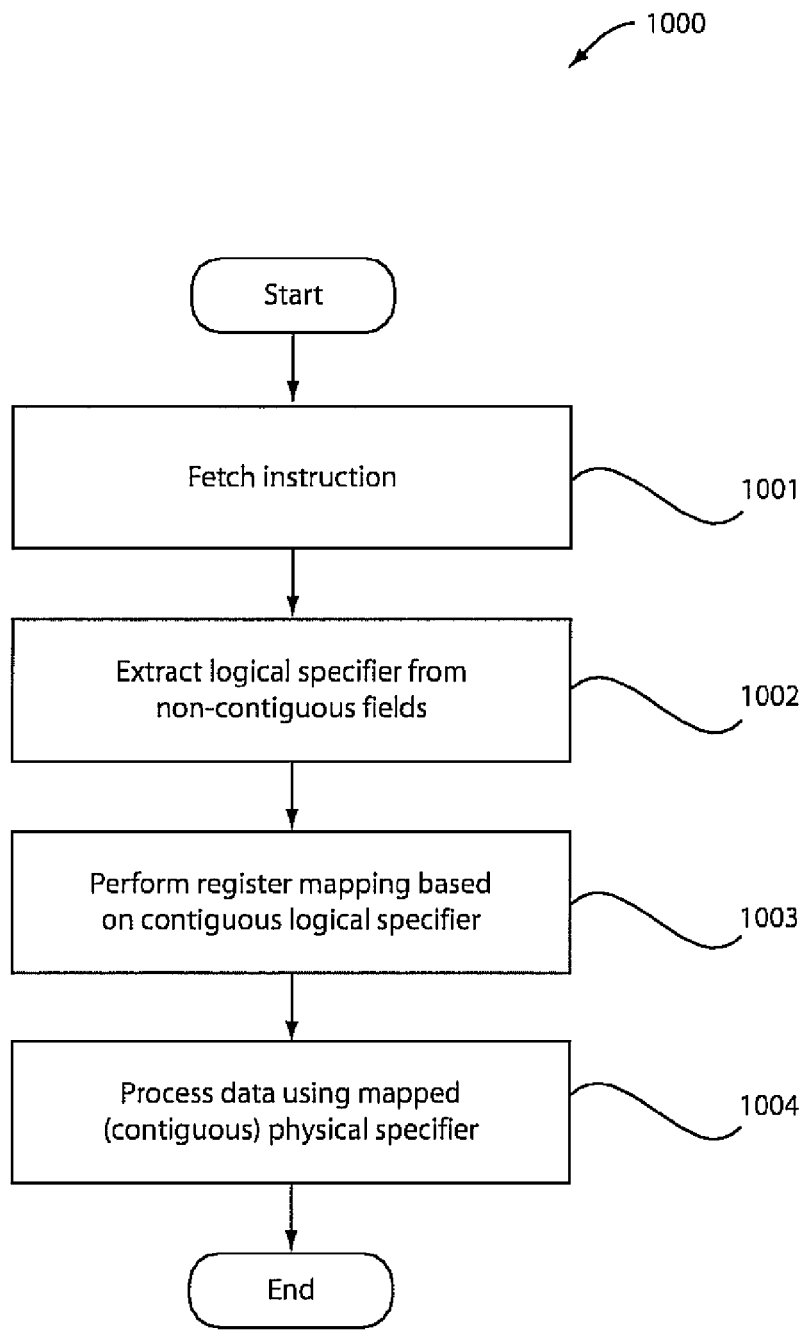
FIG. 10 is a diagram illustrating an exemplary method for moving from a set of non-contiguous extended register specifier sub-fields through register remapping, in accordance with an embodiment of the present invention.

FIG. 10 presents a method 1000 for register renaming instructions having non-contiguous register specifiers in accordance with an embodiment of the present invention. The method 1000 migrates the initial non-contiguous extended register file specifiers into a format compatible with traditional register rename mapping. An instruction word having a non-contiguous register specified is fetched (step 1001). A contiguous logic specifier is extracted from the instruction word having a non-contiguous register specifier, by extracting and concatenating non-contiguous fields of the specifier (step 1002). Register renaming (mapping) is performed based on a contiguous logic specifier generated at step 1002, giving a contiguous physical register specifier (step 1003). Data is processed using the contiguous physical register specifier generated at step 1003 (step 1004).

In reference to FIG. 9, the mechanisms for converting from the noncontiguous extended register specifier sub-fields to the contiguous register specifier will be situated within decode logic, and can be situated in the core either before the instruction is placed in the instruction queue 903 (i.e., in logic unit 931) or subsequent to the instruction queue and prior to the register map table 920 and free registers queue 922 units (i.e., in logic block 932).

According to an embodiment of the present invention, a superscalar processor that supports the processing of an optimized specification for addressing extended registers is augmented with the following: (1) a first mechanism for identifying if an instruction uses the extended register specification; (2) a second mechanism for extracting legacy (short) register specifier fields; (3) a third mechanism for extracting extended sub-specifier fields; (4) a fourth mechanism for merging the short specifier field extracted by the second mechanism with an optional extended sub-specifier of the third mechanism under the control of identification information provided by the first mechanism; (5) optionally combining the merged register specification of the fourth mechanism with additional register specifier bits to indicate register names belonging to multiple threads in a microprocessor supporting simultaneous multithreading, or to add specifiers corresponding to registers used during the execution of microcode.

In a preferred embodiment, this is performed during one of instruction L1 cache reload, instruction fetch, and instruction pre-decode. After a unified specification has been obtained by the described mechanisms, the unified extended register specification is passed to the microprocessor core for renaming of the unified register specifier to a physical register name.

What is needed is an improved way to encode larger numbers of registers. Thus, an implementation of an extended register file set provides the following three aspects: (1) encodes the extended register set in the fixed width instruction word without extension to the instruction word width; (2) provides the ability to simultaneously access the entire extended register set in a single operation, for a substantial subset of the instruction operation repertoire; and (3) encodes each operand specifier independently for almost all operations, such that registers can be specified as operands independently in each operand position.

The first aspect offers the following advantages. In one advantage, the CMODEX (concurrent modification and execution) issue in variable length instruction words is addressed, wherein a concurrent modification of an instruction word during its execution can lead to incorrect results. This is an inherent problem in all CISC and other variable width instruction sets.

In another advantage, the code density issue raised by a wider instruction word is resolved.

In yet another advantage, the instruction alignment and decode and execution issues associated with variable instruction words are resolved.

In a further advantage, an extended instruction set is provided to improve performance by directly specifying the addressed registers in the instruction word as a register specifier field.

The second aspect offers the following advantages. In one advantage, the use of the entire extended register set is allowed to speed up the execution of a single single-thread program.

In another advantage, symmetric use for the extended register set is provided, wherein most extended registers can be used as substantially all operands in conjunction with a significant portion of the instruction operation repertoire with minimal restrictions.

In yet another advantage, the compiler instruction selection and register allocation phases are simplified, thereby allowing the compiler more freedom of action to generate better schedules and register allocation maps.

In a further advantage, simpler implementations with orthogonal, streamlined operand decoding logic may be obtained.

The third aspect offers the following advantages. In one advantage, orthogonal operand use is provided to simplify programming.

In another advantage, symmetric use is provided for the extended register set, wherein most extended registers can be used as substantially all operands independently of the use of other operands, in conjunction with a significant portion of the instruction operation repertoire with minimal restrictions In yet another advantage, the compiler instruction selection and register allocation phases are simplified, thereby allowing the compiler more freedom of action to generate better schedules and register allocation maps.

In a further advantage, implementations with orthogonal, streamlined operand decoding logic are simplified.

In accordance with an embodiment of an orthogonal extended register file set for a fixed width instruction word, additional bits for specifying a register operand are provided.

In the following examples and exemplary embodiments, the VMX2 instruction set specification, which provides the advantageous properties described herein, is employed. In accordance with the VMX2 instruction set specification, the register file size and operational repertoire are extended. In a subset of the VMX2 specification, the VMX128 instruction set specification subset of VMX2 provides an extension of the number of registers available in the register, while substantially maintaining the instruction operation repertoire (with the addition of optimized operations for multimedia processing).

Referring now to FIGS. 11A-11C, there are shown instruction formats 1100, 1130, and 1160, respectively, for the VMx instruction set extension to the PowerPC architecture. In accordance with the VMX instruction set specification, a VMX instruction includes a 6 bit primary opcode field in bit positions 0 to 5 (labeled as opcode OPCD field).

VMX instructions are encoded using one of 3 basic format types. In the first format type 1100, shown in FIG. 11A, X-Form operations are identified by a primary opcode field with value decimal 31, and are used to implement load and store instructions, as well as other instructions used to support memory access, such as lsvl and lsvr instructions. In accordance with the X-Form format, there is provided a secondary (or extended) opcode field (labeled as extended opcode XO field) from bits 21 to 30. In addition, there are provided 3 register specifier fields, for one VMX source operand (for store instructions) or target operand (for load or compute permute control word instructions) in register specifier field VT from bits 6 to 10, and two general purpose register specifier fields, ranging from bits 11-15, and bits 16-20.

In the second format type 1130, shown in FIG. 11B, VA-Form operations are identified by a primary opcode with value decimal 4 and a subset of XO field bits, and are used to implement 4 operand VMX operations, such as permute, select and fused-multiply-add operations (and so forth), all having 3 vector register input operands and one vector register output operand, as well as some shift and other rotate by immediate operations, having one immediate and 2 vector register input operands, and one vector output operand. In accordance with this format, the instruction has an XO-field (labeled as extended opcode XO field) ranging from bits 26 to 31.

In the third format type 1160, shown in FIG. 11C, VX-Form operations are identified by a primary opcode with value decimal 4 and a subset of XO field bits, and are used to implement 3 operand VMX operations, such as arithmetic and logical operations, compare, and so forth. The VX form has an extended opcode XO-field (labeled as extended opcode XO field) ranging from bits 21 to 31. In addition, the VX format has a vector register target specifier field VT in bits 16-10, and two source operand specifiers in bits 11-15, and bits 16-20, which can be used to specify either a vector register input, or a signed or unsigned immediate constant operand, based on the particular XO format selected by the value of the XO field.

Referring to FIG. 12A, there is shown an exemplary encoding 1200 of instructions supporting 5 bit specifiers in accordance with a legacy RISC specification.

Having thus put forward the encoding of the advanced VMX vector media extension architecture with thirty-two 128b vector registers, it is desirable to extend the operation repertoire to include an extended set of operations, and to allow the addressing of more operands. Having further put forward a desire to maintain a fixed-width RISC ISA, an initial extension of the register file to support 128 registers might be encoded by providing wide 7 bit register specifier fields to indicate one of 128 registers, in accordance with the encoding 1250 of FIG. 12B. While wide specifiers in contiguous fields are desirable in extensions devoid of legacy instruction support, they are not advantageous in modern extensions of architectures having pre-existing instruction words using short specifiers.

Figure 12C:
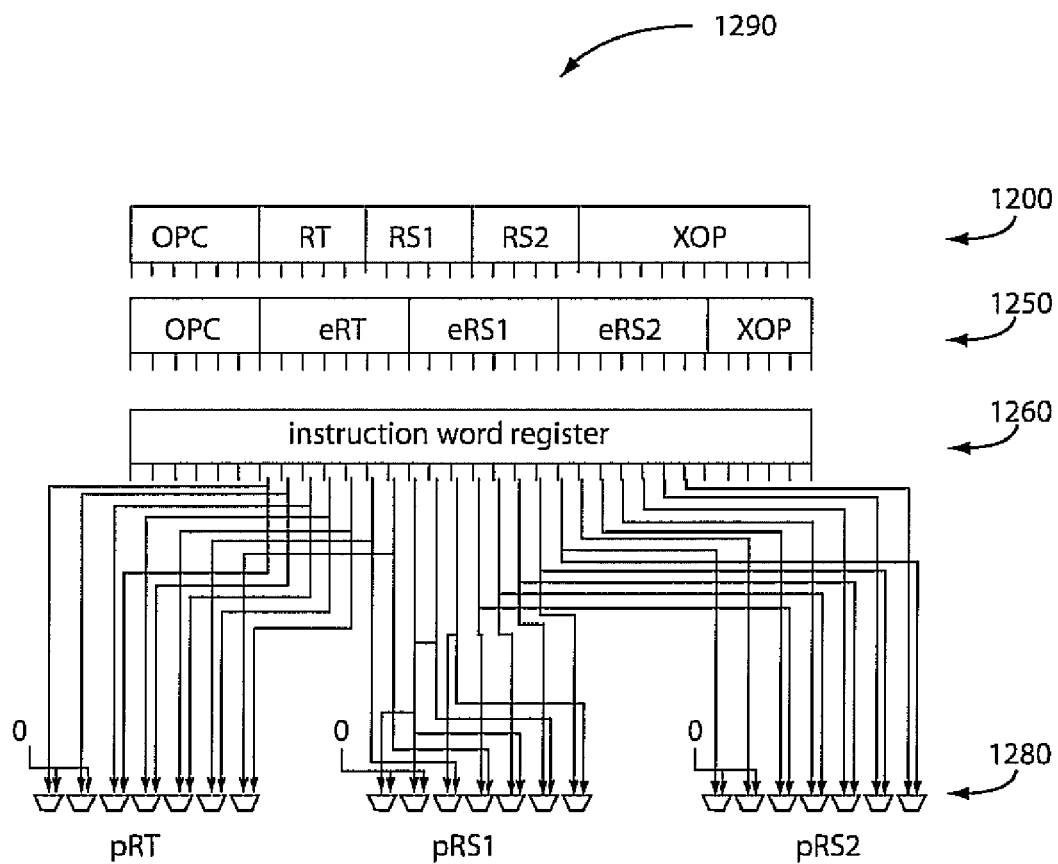
FIG. 12C is a diagram illustrating an impact of extending a register file specification by using wide register specifiers on routing during the instruction decode phase, in accordance with an embodiment of the present invention.

However, such an attempt at extending register fields will complicate register specifier routing and require additional expensive routing and multiplexing circuitry. Referring now to FIG. 12C, instruction word register routing is indicated generally by the reference numeral 1290, Register specifiers are extracted from encodings 1200 and 1250 stored in an instruction word register 1260. In the instruction word register routing 1290, one of a 5 bit register specifier field and a 7 bit register field is extracted from the instruction word under the control of at least one of the opcode and the extended opcode. The extraction logic uses multiplexers 1280 to select from either a 5 bit field (extending unspecified bits with "0") or a 7 bit field, under the control of at least one of opcode and extended opcode (opcode decoding logic using as input at least one of opcode and extended opcode and steering control signal of multiplexers not shown), to generate 7 bit physical register specifiers pRT, pRS1, and pRS2 representing a fully extended internal register specifier.

In addition to logic complexity, the rearrangement of bits from the instruction word will lead to severe routing congestion during the decode phase, as the specifier bits for all operands have to be realigned and in accordance with the two concurrently supported register specification formats. The resulting routing congestion will lead to an increase in area, as well as impact the achievable microprocessor frequency.

Thus, what is needed is a novel improved encoding which will align the register specifier bits to minimize routing congestion and thereby lead to improved implementations of an extended register specification.

Figure 13A:
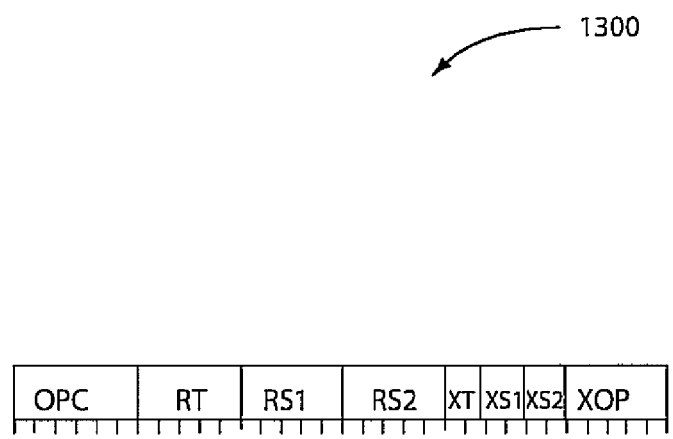
FIG. 13A is a diagram illustrating an improved encoding of 7 bit register specifiers using a method for encoding non-contiguous register specifiers, in accordance with an embodiment of the present invention.

Turning to FIG. 13A, an improved encoding of 7 bit register specifiers using a method for encoding non-contiguous register specifiers is indicated generally by the reference numeral 1300. In accordance with the encoding 1300, a 7 bit register operand specifier is defined to include two non-contiguous register specifier fields. Thus, in one embodiment, a 7 bit target register specifier includes a 2 bit extended sub-specifier concatenated with a 5 bit sub-specifier. In a preferred embodiment, the 5 bit sub-specifier is aligned with the 5 bit specifier field of the original instruction set specification. Based on this encoding, one instruction set specification specifies instructions including the fields: OPC, opcode; RT, 5 bit register target sub-specifier (preferably aligned in its instruction encoding specification with legacy 5 bit target specifier); RS1, 5 bit register source 1 operands sub-specifier (preferably aligned in its instruction encoding specification with legacy 5 bit register source 1 specifier); RS2, 5 bit register source 2 operands sub-specifier (preferably aligned in its instruction encoding specification with legacy 5 bit register source 2 specifier); XT, 2 bit extended register target sub-specifier (preferably aligned in its instruction encoding specification with legacy 5 bit target specifier); XS1, 2 bit extended register source 1 operands sub-specifier (preferably aligned in its instruction encoding specification with legacy 5 bit register source 1 specifier); XS2, 2 bit extended register source 2 operands sub-specifier (preferably aligned in its instruction encoding specification with legacy 5 bit register source 2 specifier); and XOP, extended opcode.

Figure 13B:
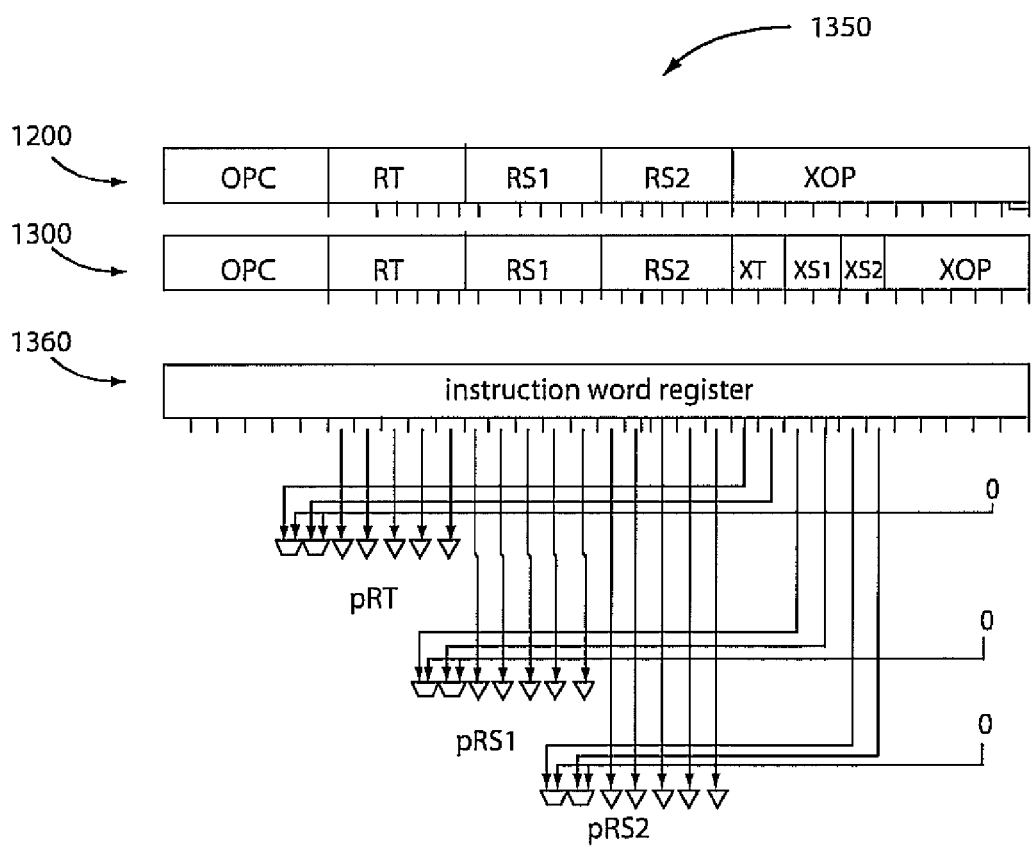
FIG. 13B is a diagram illustrating improved operand routing with an optimized register operand specifier definition in accordance with the present invention.

Referring now to FIG. 13B, there is shown logic 1350 for the extraction of register specifiers from encodings 1200 and 1300 stored in an instruction word register 1360 enabled by an optimized extended register format specification, significantly reducing wiring congestion and thus leading to smaller area and higher performance implementations of a microprocessor implementing an extended register specification based on the use of non-contiguous register specifiers.

Figure 14:
FIG. 14 is a diagram illustrating exemplary programming examples that, in turn, show the efficiency of VMX2/64/128 over VMX, in accordance with an embodiment of the present invention.

Referring now to FIG. 14, there is shown exemplary code 1400 for a Power Architectures specification having a 128 register VMX specification (VMX128) and using the described non-contiguous register specifiers. The program is preferably executed on a microprocessor adapted to executing instructions including non-contiguous register specifiers.

Instruction 1401 load the ctr register with the value included in general purpose register R0.

Instruction 1402 loads a plurality of data bytes starting at an indicated address stored in general purpose register R8, from the address up to the next 16 byte boundary, and left aligns the data in vector register V12 (i.e., the MSB of the retrieved data aligns with the MSB of the register). Non-loaded target data bytes are initialized to 0.

Instruction 1403 adds the constant 16 to general purpose register R8, and stores the result in general purpose register R8.

Instruction 1404 loads a plurality of data bytes starting at the 16B boundary up to, but not including the indicated address stored in general purpose register R8, and right aligns the data in vector register V13 (i.e., the LSB of the retrieved data aligns with the LSB of the register). Non-loaded target data bytes are initialized to 0.

Instruction 1405 clears a general purpose register R8.

Instruction 1405 combines the data retrieved by instructions 1402 and 1404, by performing a logical OR of vector registers V12 and V13. The result (a 16B contiguous data item loaded from address R8) is stored in vector register V8.

Instruction 1406 distributes a single 32b word included in vector register V8 across all vector slots of target register V8 in accordance with the specification of the Power Architecture™ vector media extension specification of vspltw.

Label 1410 indicates the beginning of a loop.

Instruction 1411 load an a 16B aligned data item indicated by the address specified as sum of general purpose registers R11 and R7 into vector register V120. (If the specified address is unaligned, the low order bits are truncated in accordance with the VMX lvx specification.)

Instruction 1412 performs a vector-SIMD single precision floating point multiply of vector registers V8 and V120, storing the result in vector register V120.

Instruction 1413 performs a store of a plurality of bytes from vector register V120 to the address specified by the sum of general purpose registers R11 and R6. The store updates a number of bytes corresponding to the distance of the specified address to the next 16B boundary, and with the first byte stored corresponding to the most significant byte included in the register.

Instruction 1414 adds constant 16 to general purpose register R11.

Instruction 1415 performs a store of bytes starting at the 16B boundary preceding the address specified by the sum of general purpose registers R11 and R6, up to the specified address. The last byte stored corresponds to the least significant byte included in the vector register in accordance with the Power Architecture™ specification. The net effect of the combination of instructions 1413 and 1415 is to store an unaligned vector word in memory.

Instruction 1416 decrements the ctr register and branches to the beginning of the loop if the counter is not zero.

Referring now to the encoding of instructions, instructions, the instructions are preferably encoded using the industry-standard Power Architecture™ encoding, in conjunction with the vector media architecture extension.

Furthermore, several instructions are encoded using the novel non-contiguous encoding, and specifically, instructions 1402, 1404 and 1411 are preferably encoded using format 104, instructions 1413 and 1415 are preferably encoded using format 102. Referring now to the encoding of vector register specifier V120, instruction encoding 100 preferably uses a field specification of VSX=11 and VS=11000 to indicate source vector register V120; and instruction encoding 100 preferably uses a field specification of VTX=11 and VT=11000 to indicate target vector register V120.

Referring now to the encoding of instruction 1412, a preferred encoding format 140 is used to allow the specification of 2 source and 1 target register and encompassing register specifiers from the extended vector register set. More specifically, an encoding uses AX=1 (both AX fields), VA=11000, VCX=00, VC=00100, VTX=11, and VT=11000.

The exemplary code fragment also shows the advantageous ease of intermixing instructions from the base architecture specification (such as instructions from the base Power Architecture™ specification, and the base VMX specification such as vor, and vspltw) and extended specification instructions in accordance with the present invention.

Referring now to the use of sequences for unaligned memory access, as shown in FIG. 14, the following sequence is used to perform unaligned read-access to memory:

| lvlx128 | V12, 0, R8 |
| addi | R8, R8, 16 |
| lvrx128 | V13, 0, R8 |
| vor | V8, V12, V13 |

Specifically, the load left operation loads at most 16 bytes of data from a specified address to a specified boundary (16 bytes in the VMX128 implementation), and stores them in a vector register starting at byte 0. In accordance with the specification of the load right instruction, it loads byte data from the 16 byte boundary following the specified address to the specified address+15 (if any), and stores them in the vector register right-adjusted (i.e., the last loaded byte, if any, is stored in byte 15).

In one embodiment the vector load left and vector load right operations perform a read-modify-write cycle on the vector register. In another embodiment of these instructions, the non-loaded bytes are initialized to zero, and a final VOR operation (or other such combinational operation as VADD) is required to combine the two partial load results. The first implementation advantageously reduces the total number of instructions, whereas the second form advantageously avoids read-modify-write operations.

In one embodiment of the invention, the load left and load right instructions are advantageously complemented by store left and store right instructions to simplify the storing of unaligned vector data, and to eliminate thread synchronization needs in multithreaded applications when the threads operate on closely co-located unaligned vector data:

| | |
|---|---|
| stvlx128 | V120, R11, R6 |
| addi | R11, R11, 16 |
| stvrx128 | V120, R11, R6 |

Mirroring the implementation of load left/load right, a first store left instruction advantageously stores a number of bytes from a specified address to the next 16B boundary, the bytes corresponding to a like number of most significant bytes in the indicated vector register. A second store right instruction stores a number of bytes from a 16B boundary immediately preceding the specified address, up to but not including the specified address, corresponding to a like number of lowest order bytes in the register.

Those skilled in this and related arts will understand that other extended register specifications extensions can be defined based upon the concepts, strategies and principles outlined herein.

In at least one embodiment, the number of registers in the extended specification is more than twice the number of registers in the subset.

In a preferred embodiment, register specifiers are encoded into non-contiguous register file specifier fields separated by at least one bit not part of the register specifier of a fixed width instruction word. In one alternate embodiment, at least one operand is encoded into at a least a first register specifier field that includes a direct bit field, and a second "deep encoding" field (such as including but not limited to an XO extended operation code field), wherein one or more additional specifier bits are only obtained after a full decode of said field.

Figure 15A:
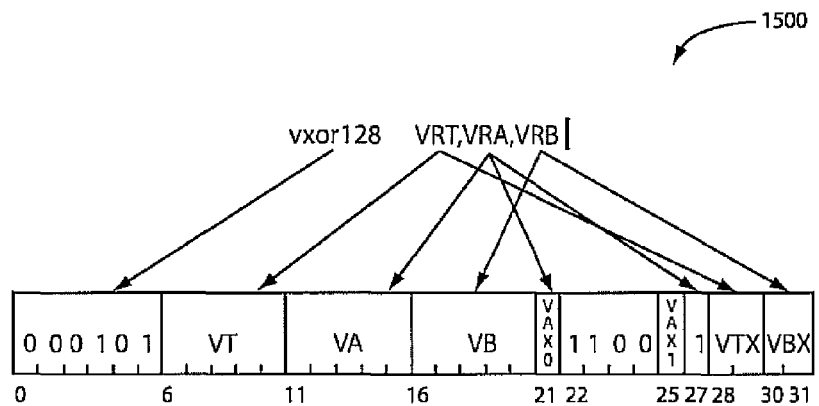
FIGS. 15A and 15B illustrate exemplary encodings of instructions with non-contiguous register specifiers in accordance with embodiments of the present invention.

Turning to FIG. 15A, register specifiers encoded into non-contiguous register file specifier fields are indicated generally by the reference numeral 1500. In FIG. 15A, the encoded register specifiers are separated by at least one bit not part of the register specifier of a fixed width instruction word. In accordance with this instruction encoding, the operation specification (vxor128) is encoded using one or more bit fields (bit fields 0 to 5 indicated, 22 to 25 and bit 27 in one exemplary encoding).

Figure 15B:
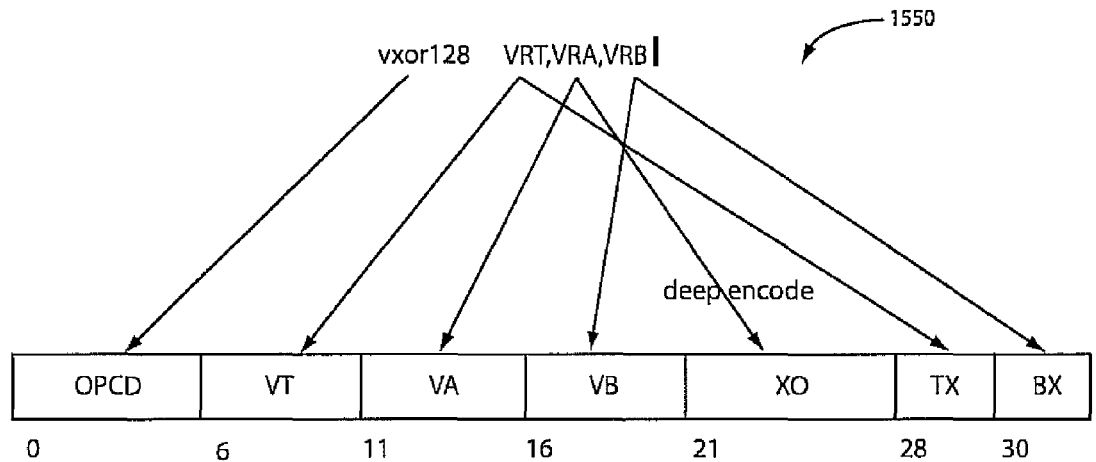

An alternate embodiment is shown in FIG. 15B. Turning to FIG. 15B, register specifiers encoded into non-contiguous register file specifier fields are indicated generally by the reference numeral 1550. In FIG. 15B, at least one operand is encoded into at a least a first register specifier field including a direct bit field, and a second "deep encoding" field (such as including but not limited to an XO extended operation code field), wherein one or more additional specifier bits are only obtained after a full decode of the field. In accordance with this instruction encoding, the operation is encoded using one or more bit fields, at least one of the bit fields having multiple code points assigned to the same operation, and the selection of a first or a second code point indicating at least one bit of information for a non-contiguous register specifier ("deep encoding"). In the exemplary figure, the vxor128 operation is encoded by a first opcode field (bits 0 to 5) and a second deeply encoded field (XO field in bits 21 to 27), the deeply encoded XO field serving to encode both 2 bits of a VRA extended register specifier and the specific operation, by allocation 4 code points to the vxor operation, the choice of the four code points indicating bits two specifier bits corresponding to "00", "01", "10" and "11", respectively.

Having described preferred embodiments of a system and method (which are intended to be illustrative and not limiting), it is noted that modifications and variations can be made by persons skilled in this and related arts in light of the above teachings. It is therefore to be understood that changes may be made in the particular embodiments disclosed which are within the scope and spirit of the invention as outlined by the appended claims. Having thus described aspects of the invention, with the details and particularity required by the patent laws, what is claimed and desired protected by Letters Patent is set forth in the appended claims.

What is claimed is:

1. A method for processing instruction code, comprising:

processing a fixed-width instruction of a fixed-width instruction set using a non-contiguous register specifier of a non-contiguous register specification, the non-contiguous register specifier including a first set of contiguous bits and a second set of contiguous bits which collectively identify a single register, the first set of contiguous bits and the second set of contiguous bits being non-contiguous with respect to each other;

performing an initial dependency analysis relating to the non-contiguous register specifier by comparing a subset of bits of the non-contiguous register specifier to a portion of another register specifier of another instruction, wherein the subset of bits includes only bits from the first set of contiguous bits, and none of the bits from the second set of contiguous bits;

wherein the fixed-width instruction includes the non-contiguous register specifier, wherein the non-contiguous register specifier includes at least the first set of contiguous bits and the second set of contiguous bits separated by at least one bit not part of the non-contiguous register specifier, and wherein the first set of contiguous bits is specified directly by an instruction field included in the fixed-width instruction, the second set of contiguous bits is specified using a deep encoding, and the method further comprises generating a set of n bits for inclusion as part of the non-contiguous register specifier from a set of m bits encoded in the fixed-width instruction, wherein n is less than m, and said generating step generates the set of n bits using a logic function decoding a plurality of extended opcodes, the plurality of extended opcodes indicating the use of a specific bit string as an extended register specifier.

2. The method of claim 1, further comprising organizing instruction bits corresponding to the fixed-width instruction in a cache accessible by a processing unit so as to improve decoding of the instruction bits.

3. The method of claim 2, wherein said organizing step comprises imposing an ordering on the instructions bits to simplify routing of the instructions bits during processing thereof.

4. The method of claim 2, wherein said organizing step comprises duplicating at least one of the instruction bits to reflect a use as either a portion of the non-contiguous register file specifier, an opcode field, or extended opcode field.

5. The method of claim 1, further comprising:
   identifying a plurality of registers using the first set of contiguous bits; and
   selecting one of the plurality of registers using the second set of contiguous bits.

6. The method of claim 1, further comprising pre-decoding the fixed-width instruction to obtain a contiguous representation of the fixed-width instruction for storing in an instruction cache.

7. The method of claim 1, wherein the first set of contiguous bits is specified directly by an instruction field in the fixed-width instruction, and the second set of contiguous bits is specified directly by another instruction field in the fixed-width instruction.

8. The method of claim 1, wherein a determination is made that no dependency exists between the fixed-width instruction and the other instruction when the initial dependency analysis determines that the subset of bits does not match the portion of the other register specifier in the other instruction.

9. A method for processing instruction code, comprising:
   processing a fixed-width instruction of a fixed-width instruction set using a non-contiguous register specifier of a non-contiguous register specification, the non-contiguous register specifier including a first set of contiguous bits and a second set of contiguous bits which collectively identify a single register, the first set of contiguous bits and the second set of contiguous bits being non-contiguous with resect to each other;
   performing an initial dependency analysis relating to the non-contiguous register specifier by comparing a subset of bits of the non-contiguous register specifier to a portion of another register specifier of another instruction, wherein the subset of bits includes only bits from the first set of contiguous bits, and none of the bits from the second set of contiguous bits;
   wherein the fixed-width instruction includes the non-contiguous register specifier, and
   wherein a subsequent dependency analysis is performed using the bits from the second set of contiguous bits when the initial dependency analysis determines that the subset of bits matches the portion of the other register specifier in the other instruction.

10. The method of claim 9, further comprising organizing instruction bits corresponding to the fixed-width instruction in a cache accessible by a processing unit so as to improve decoding of the instruction bits.

11. The method of claim 10, wherein said organizing step comprises imposing an ordering on the instructions bits to simplify routing of the instructions bits during processing thereof.

12. The method of claim 10, wherein said organizing step comprises duplicating at least one of the instruction bits to reflect a use as either a portion of the non-contiguous register file specifier, an opcode field, or extended opcode field.

13. The method of claim 9, further comprising:
   identifying a plurality of registers using the first set of contiguous bits; and
   selecting one of the plurality of registers using the second set of contiguous bits.

14. The method of claim 9, further comprising pre-decoding the fixed-width instruction to obtain a contiguous representation of the fixed-width instruction for storing in an instruction cache.

15. The method of claim 9, wherein the first set of contiguous bits is specified directly by an instruction field in the fixed-width instruction, and the second set of contiguous bits is specified directly by another instruction field in the fixed-width instruction.

16. The method of claim 9, wherein a determination is made that no dependency exists between the fixed-width instruction and the other instruction when the initial dependency analysis determines that the subset of bits does not match the portion of the other register specifier in the other instruction.

* * * * *